US012103081B2

(12) United States Patent
Takadate et al.

(10) Patent No.: US 12,103,081 B2
(45) **Date of Patent: *Oct. 1, 2024**

(54) DUST CORE, METHOD FOR MANUFACTURING DUST CORE, INDUCTOR INCLUDING DUST CORE, AND ELECTRONIC/ELECTRIC DEVICE INCLUDING INDUCTOR

(71) Applicant: Alps Alpine Co., Ltd., Tokyo (JP)

(72) Inventors: Kinshiro Takadate, Niigata-ken (JP); Hisato Koshiba, Niigata-ken (JP); Shokan Yamashita, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 26 days.

This patent is subject to a terminal disclaimer.

(21) Appl. No.: 17/983,270

(22) Filed: Nov. 8, 2022

(65) Prior Publication Data

US 2023/0081183 A1 Mar. 16, 2023

Related U.S. Application Data

(63) Continuation of application No. 15/712,655, filed on Sep. 22, 2017, now Pat. No. 11,529,679, which is a
(Continued)

(30) Foreign Application Priority Data

May 19, 2015 (JP) ................................ 2015-102104

(51) Int. Cl.
*H01F 3/08* (2006.01)
*B22F 1/00* (2022.01)
(Continued)

(52) U.S. Cl.
CPC .................. *B22F 3/00* (2013.01); *B22F 1/00* (2013.01); *B22F 1/052* (2022.01); *B22F 1/06* (2022.01);
(Continued)

(58) Field of Classification Search
None
See application file for complete search history.

(56) References Cited

U.S. PATENT DOCUMENTS 9,117,582 B2 8/2015 Nakamura
11,529,679 B2 * 12/2022 Takadate .................. B22F 3/02
(Continued)

FOREIGN PATENT DOCUMENTS

JP 07-34183 2/1995
JP 2001-196216 7/2001
(Continued)

OTHER PUBLICATIONS

International Search Report from International Application No. PCT/JP2016/063842 dated Jul. 19, 2016.

*Primary Examiner* — Sally A Merkling
*Assistant Examiner* — Sean P. O'Keefe
(74) *Attorney, Agent, or Firm* — Beyer Law Group LLP

(57) ABSTRACT

A dust core contains a powder of a crystalline magnetic material powder and a powder of an amorphous magnetic material. The sum of the content of the crystalline magnetic material powder and the content of the amorphous magnetic material powder is 83 mass percent or more. The mass ratio of the content of the crystalline magnetic material powder to the sum of the content of the crystalline magnetic material powder and the content of the amorphous magnetic material powder is 20 mass percent or less. The median diameter D50a of the amorphous magnetic material powder is greater than or equal to the median diameter D50c of the crystalline magnetic material powder. A 10% cumulative diameter D10a in a volume-based cumulative particle size distribution of the amorphous magnetic material powder is 9.5 μm or less.

18 Claims, 25 Drawing Sheets

Related U.S. Application Data continuation of application No. PCT/JP2016/063842, filed on May 10, 2016.

(51) Int. Cl.

| | |
|---|---|
| ***B22F 1/052*** | (2022.01) |
| ***B22F 1/06*** | (2022.01) |
| ***B22F 1/08*** | (2022.01) |
| ***B22F 1/102*** | (2022.01) |
| ***B22F 3/00*** | (2021.01) |
| ***B22F 3/02*** | (2006.01) |
| ***C22C 45/02*** | (2006.01) |
| ***H01F 1/153*** | (2006.01) |
| ***H01F 1/22*** | (2006.01) |
| ***H01F 1/26*** | (2006.01) |
| ***H01F 17/06*** | (2006.01) |
| ***H01F 41/02*** | (2006.01) |

(52) U.S. Cl.

CPC .................. *B22F 1/08* (2022.01); *B22F 1/09* (2022.01); *B22F 1/102* (2022.01); *B22F 3/02* (2013.01); *C22C 45/02* (2013.01); *H01F 1/153* (2013.01); *H01F 1/15375* (2013.01); *H01F 1/22* (2013.01); *H01F 1/26* (2013.01); *H01F 3/08* (2013.01); *H01F 17/06* (2013.01); *H01F 41/0246* (2013.01); *B22F 2999/00* (2013.01); *H01F 17/062* (2013.01)

(56) References Cited

U.S. PATENT DOCUMENTS

| | | | | |
|---|---|---|---|---|
| 2004/0074564 | A1 | 4/2004 | Brunner | |
| 2010/0289609 | A1 * | 11/2010 | Liao .......................... | B22F 3/12 336/221 |
| 2011/0024670 | A1 | 2/2011 | Otsuki et al. | |
| 2015/0243420 | A1 | 8/2015 | Miyamura et al. | |
| 2016/0086715 | A1 * | 3/2016 | Lin ......................... | H01F 27/00 336/221 |

FOREIGN PATENT DOCUMENTS

| | | | |
|---|---|---|---|
| JP | 2005-510049 | | 4/2005 |
| JP | 2005-294458 | | 10/2005 |
| JP | 2006-13066 | | 1/2006 |
| JP | 2006-237153 | | 9/2006 |
| JP | 2006237153 | A * | 9/2006 |
| JP | 2008-192896 | | 8/2008 |
| JP | 2010-118486 | | 5/2010 |
| WO | 2009/128425 | | 10/2009 |
| WO | 2014/054430 | | 4/2014 |

* cited by examiner

DUST CORE, METHOD FOR MANUFACTURING DUST CORE, INDUCTOR INCLUDING DUST CORE, AND ELECTRONIC/ELECTRIC DEVICE INCLUDING INDUCTOR

CLAIM OF PRIORITY

This application is a Continuation of U.S. patent application Ser. No. 15/712,655 filed on Sep. 22, 2017, which is a Continuation of International Application No. PCT/JP2016/063842 filed on May 10, 2016, which claims benefit of Japanese Patent Application No. 2015-102104 filed on May 19, 2015. The entire contents of each application noted above are hereby incorporated by reference.

BACKGROUND OF THE INVENTION

1. Field of the Invention

The present invention relates to a dust core, a method for manufacturing the dust core, an inductor including the dust core, and an electronic/electric device including the inductor. The term "inductor" as used herein refers to a passive element including a coil and a core member including a dust core and includes a concept of a reactor.

2. Description of the Related Art

Dust cores for use in inductors, such as reactors, transformers, and choke coils, used in boosting circuits for hybrid vehicles, generators, and transforming stations can be obtained by compacting a soft magnetic powder. An inductor including such a dust core is required to have both low core loss and excellent direct-current superposition characteristics.

Japanese Unexamined Patent Application Publication No. 2006-13066 (hereinafter referred to as "Patent Literature 1) discloses, as a means for solving the above problem (having both low core loss and excellent direct-current superposition characteristics), an inductor in which a coil is integrally embedded in a core formed by pressing a powder mixture of a magnetic powder and a binder, the magnetic powder used being a powder obtained by mixing a carbonyl iron powder with 5 weight percent to 20 weight percent of a Sendust powder.

Japanese Unexamined Patent Application Publication No. 2010-118486 (hereinafter referred to as "Patent Literature 2") discloses, as an inductor capable of further reducing the core loss, an inductor including a magnetic core (dust core) containing a solidified mixture of an insulating material and a powder mixture obtained by blending 90 mass percent to 98 mass percent of an amorphous soft magnetic powder with 2 mass percent to 10 mass percent of a crystalline soft magnetic powder. In the magnetic core (dust core), the amorphous soft magnetic powder is regarded as material for reducing the core loss of the inductor and the crystalline soft magnetic powder is regarded as material which increases the filling factor of the powder mixture to increase the magnetic permeability and which acts as a binder for bonding particles in the amorphous soft magnetic powder together.

In Patent Literature 1, powders of different types of crystalline magnetic materials are used as raw materials for a dust core for the purpose of enhancing direct-current superposition characteristics. In Patent Literature 2, a powder of a crystalline magnetic material and a powder of an amorphous magnetic material are used as raw materials for a dust core for the purpose of further reducing the core loss. However, in Patent Literature 2, no direct-current superposition characteristics have been evaluated.

SUMMARY OF THE INVENTION

The present invention provides a dust core which contains a powder of a crystalline magnetic material and a powder of an amorphous magnetic material, which can enhance direct-current superposition characteristics of an inductor including the dust core, and which can reduce the core loss of the inductor; a method for manufacturing the dust core; an inductor including the dust core; and an electronic/electric device including the inductor.

The inventors have performed investigations for the purpose of solving the above problem and, as a result, have obtained a novel finding that appropriately adjusting the particle size distribution of a powder of a crystalline magnetic material and the particle size distribution of a powder of an amorphous magnetic material increases the sum (the sum is herein also referred to as the "core alloy ratio") of the content (the term "content of powder" (unit:mass percent) is herein referred to as the content with respect to a dust core) of the crystalline magnetic material powder and the content of the amorphous magnetic material powder, thereby enabling the above problem to be solved.

The present invention has been completed on the basis of the finding and is as described below.

An aspect of the present invention provides a dust core containing a powder of a crystalline magnetic material and a powder of an amorphous magnetic material. The sum (core alloy ratio) of the content of the crystalline magnetic material powder and the content of the amorphous magnetic material powder is 83 mass percent or more. The mass ratio (first mixing ratio) of the content of the crystalline magnetic material powder to the sum (core alloy ratio) is 20 mass percent or less. The median diameter D50 of the amorphous magnetic material powder is greater than or equal to the median diameter D50 of the crystalline magnetic material powder. The ratio (first particle size ratio) of the 10% cumulative diameter $D10_a$ in the volume-based cumulative particle size distribution of the amorphous magnetic material powder to the 90% cumulative diameter D90b in the volume-based cumulative particle size distribution of the crystalline magnetic material powder ranges from 0.3 to 2.6.

In the case where the particle size distribution of the crystalline magnetic material powder and the particle size distribution of the amorphous magnetic material powder satisfy the above relationship, when the first mixing ratio is 20 mass percent or less, it is likely to be stably achieved that the core alloy ratio is 83 mass percent or more. As a result, in an inductor including the dust core, direct-current superposition characteristics can be enhanced and the core loss can be reduced.

The crystalline magnetic material may contain one or more selected from the group consisting of Fe—Si—Cr alloys, Fe—Ni alloys, Fe—Co alloys, Fe—V alloys, Fe—Al alloys, Fe—Si alloys, Fe—Si—Al alloys, carbonyl iron, and pure iron.

The crystalline magnetic material is preferably made of carbonyl iron.

The amorphous magnetic material may contain one or more selected from the group consisting of Fe—Si—B alloys, Fe—P—C alloys, and Co—Fe—Si—B alloys.

The amorphous magnetic material is preferably made of an Fe—P—C alloy.

The crystalline magnetic material powder is preferably made of an insulated material. Within the above range, the increase in insulating resistance of the dust core and the reduction of the core loss Pcv in a high frequency band are stably achieved.

The median diameter D50 of the crystalline magnetic material powder is preferably 10 μm or less. The above provision regarding the first particle size ratio is readily satisfied.

The dust core may further contain a binding component binding the crystalline magnetic material powder and the amorphous magnetic material powder to another material contained in the dust core. In this case, the binding component preferably contains a sub-component based on a resin material.

Another aspect of the present invention provides a method for manufacturing the dust core. The method includes a molding step of obtaining a molded product by molding including press-molding a mixture containing the crystalline magnetic material powder, the amorphous magnetic material powder, and a binder component made of the resin material. The method allows the dust core to be efficiently manufactured.

The molded product may be the dust core. Alternatively, the method may further include a heat treatment step of obtaining the dust core by heat-treating the molded product.

Another aspect of the present invention provides an inductor including the dust core, a coil, and connection terminals each connected to an end portion of the coil. At least one portion of the dust core is placed so as to be located in an induced magnetic field generated by the current applied to the coil through the connection terminals. The inductor can achieve both excellent direct-current superposition characteristics and low core loss on the basis of excellent properties of the dust core.

Another aspect of the present invention provides an electronic/electric device including the inductor. The inductor is connected to a substrate through the connection terminals. Examples of the electronic/electric device include power-supply systems including a power supply switching circuit, a voltage step-up/down circuit, or a smoothing circuit and compact portable communication devices. The electronic/electric device according to the present invention includes the inductor and therefore readily copes with a large current.

A dust core according to the present invention can enhance direct-current superposition characteristics of an inductor including the dust core and can reduce the core loss of the inductor because the particle size distribution of a powder of a crystalline magnetic material and the particle size distribution of a powder of an amorphous magnetic material are appropriately adjusted.

DESCRIPTION OF THE PREFERRED EMBODIMENTS

Embodiments of the present invention are described below in detail.

1. Dust Core

Figure 1:
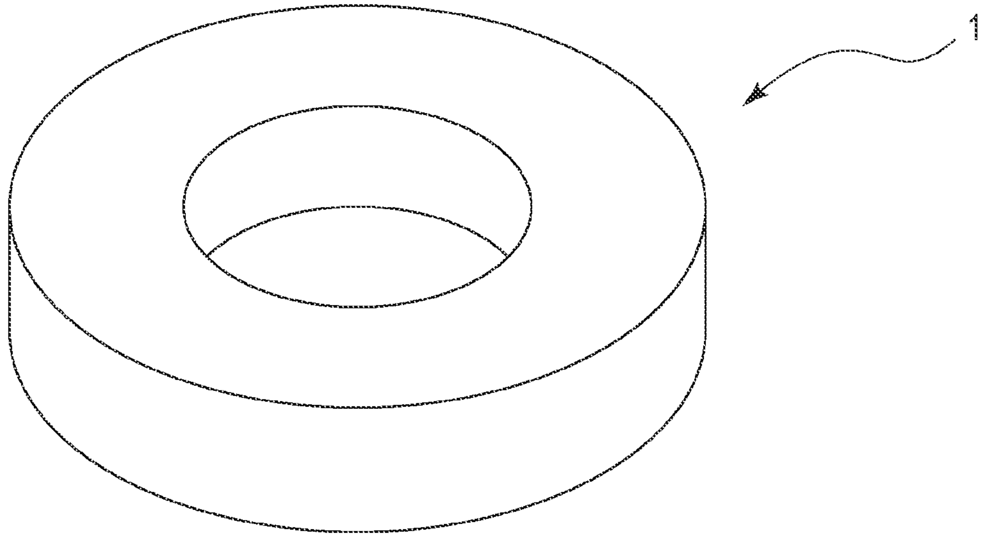
FIG. 1 is a schematic perspective view of a dust core according to an embodiment of the present invention.

FIG. 1 shows a dust core 1 according to an embodiment of the present invention. The dust core 1 is ring-shaped in appearance and contains a powder of a crystalline magnetic material and a powder of an amorphous magnetic material. The dust core 1 is one manufactured by a method including molding including press-molding a mixture containing these powders. In a non-limited example, the dust core 1 according to this embodiment contains a binding component binding the crystalline magnetic material powder and the amorphous magnetic material powder to other materials (the same type of materials or different types of materials in some cases) contained in the dust core 1.

The sum (core alloy ratio) of the contents of the crystalline magnetic material powder and amorphous magnetic material powder in the dust core 1 is 83 mass percent or more. When the core alloy ratio is 83 mass percent or more, direct-current superposition characteristics of an inductor including the dust core 1 can be enhanced. Regarding this, in spite of dust cores that are substantially equal in initial magnetic permeability, as the core alloy ratio of the dust cores is higher, the magnetic permeability thereof tends to be more unlikely to reduce in such a state that a direct current is superimposed. When the core alloy ratio is 83 mass percent or more, the relative magnetic permeability is likely to be 40 or more even if the applied bias electric field is 5,500 A/m.

(1) Powder of Crystalline Magnetic Material

The specific type of the crystalline magnetic material is not particularly limited and the crystalline magnetic material may be crystalline (a diffraction spectrum with clear peaks sufficient to identify the type of material is obtained by general X-ray diffraction measurement) and ferromagnetic. Examples of the crystalline magnetic material include Fe—Si—Cr alloys, Fe—Ni alloys, Fe—Co alloys, Fe—V alloys, Fe—Al alloys, Fe—Si alloys, Fe—Si—Al alloys, carbonyl iron, and pure iron. The crystalline magnetic material may be composed of a single type of material or different types of materials. The crystalline magnetic material is preferably one or more selected from the above materials. In particular, the crystalline magnetic material preferably contains carbonyl iron and is more preferably made of carbonyl iron. Carbonyl iron has high saturated magnetic flux density, is soft, and is likely to be plastically deformed; hence, the density of the dust core 1 is readily increased during molding. Furthermore, the median diameter D50 is fine, 5 μm or less, and therefore the eddy-current loss can be suppressed.

The shape of particles of the crystalline magnetic material is not limited. The shape of the crystalline magnetic material particles may be spherical or non-spherical. When the shape thereof is non-spherical, the crystalline magnetic material particles may have an anisotropic shape such as a flake shape, an oval shape, a droplet shape, or a needle shape or an irregular shape with no specific anisotropy. Examples of irregular particles include a plurality of spherical particles directly bonded to each other and a plurality of spherical particles that are bonded to other particles so as to be partially embedded in the other particles. Such particles are likely to be observed in carbonyl iron.

The shape of the crystalline magnetic material particles may be a shape obtained in the course of producing the crystalline magnetic material or a shape obtained by secondarily processing the produced crystalline magnetic material. Examples of the former shape include a spherical shape, an oval shape, a droplet shape, and a needle shape. An example of the latter shape is a flake shape.

The particle diameter of the crystalline magnetic material powder is set in relation to the particle diameter of the amorphous magnetic material powder as described below.

The content of the crystalline magnetic material powder in the dust core 1 is such an amount that the mass ratio (first mixing ratio) of the content of the crystalline magnetic material powder to the sum (core alloy ratio) of the content of the crystalline magnetic material powder and the content of the amorphous magnetic material powder is 20 mass percent or less. When the first mixing ratio is 20 mass percent or less, the excessive increase in core loss Pcv of the dust core 1 can be suppressed. As a basic tendency, as the first mixing ratio is higher, direct-current superposition characteristics of the inductor including the dust core 1 are further enhanced. However, when the first mixing ratio is more than 20 mass percent, the above tendency is not clear and the merit of using the crystalline magnetic material powder is unlikely to be obtained. From the viewpoint of stably achieving the improvement of direct-current superposition characteristics of the inductor including the dust core 1 and the suppression of the increase in core loss Pcv thereof, the first mixing ratio is preferably 18 mass percent or less, more preferably 15 mass percent or less, and particularly preferably 12 mass percent or less.

At least one portion of the crystalline magnetic material powder is preferably made of an insulated material and the crystalline magnetic material powder is more preferably made of the insulated material. In the case where the crystalline magnetic material powder is insulated, the insulating resistance of the dust core 1 tends to increase. Furthermore, not only in a high-frequency band but also in a low-frequency band, the core loss Pcv tends to decrease in some cases. The type of an insulating treatment applied to the crystalline magnetic material powder is not particularly limited. A phosphoric acid treatment, a phosphate treatment, and an oxidation treatment are exemplified.

(2) Powder of Amorphous Magnetic Material

The specific type of the amorphous magnetic material, which gives the amorphous magnetic material powder contained in the dust core 1 according to an embodiment of the present invention, is not particularly limited and the amorphous magnetic material may be amorphous (any diffraction spectrum with clear peaks sufficient to identify the type of material is not obtained by general X-ray diffraction measurement) and may be a ferromagnetic material, particularly a soft magnetic material. Examples of the amorphous magnetic material include Fe—Si—B alloys, Fe—P—C alloys, and Co—Fe—Si—B alloys. The amorphous magnetic material may be composed of a single type of material or different types of materials. The crystalline magnetic material is preferably one or more selected from the group consisting of the above materials. In particular, the amorphous magnetic material preferably contains an Fe—P—C alloy and is more preferably made of the Fe—P—C alloy.

An example of the Fe—P—C alloy is an Fe-based amorphous alloy represented by the composition formula $Fe_{100-a-b-c-x-y-z-t}Ni_aSn_bCr_cP_xC_yB_zSi_t$, where 0 at %≤a≤10 at %, 0 at %≤b≤3 at %, 0 at %≤c≤6 at %, 6.8 at %≤x≤13 at %, 2.2 at %≤y≤13 at %, 0 at %≤z≤9 at %, and 0 at %≤t≤7 at %. In the above composition formula, Ni, Sn, Cr, P, C, B, and Si are arbitrarily added elements.

The content of Ni in the Fe-based amorphous alloy is preferably 0 atomic percent to 6 atomic percent and more preferably 0 atomic percent to 4 atomic percent. The content of Sn in the Fe-based amorphous alloy is preferably 0 atomic percent to 2 atomic percent and may range from 1 atomic percent to 2 atomic percent. The content of Cr in the Fe-based amorphous alloy is preferably 0 atomic percent to 2 atomic percent and more preferably 1 atomic percent to 2 atomic percent. The content of P in the Fe-based amorphous alloy is preferably 8.8 atomic percent or more in some cases. The content of C in the Fe-based amorphous alloy is preferably 4 atomic percent to 10 atomic percent and more preferably 5.8 atomic percent to 8.8 atomic percent in some cases. The content of B in the Fe-based amorphous alloy is preferably 0 atomic percent to 6 atomic percent and more preferably 0 atomic percent to 2 atomic percent. The content of Si in the Fe-based amorphous alloy is preferably 0 atomic percent to 6 atomic percent and more preferably 0 atomic percent to 2 atomic percent.

The shape of particles of the amorphous magnetic material is not limited. The type of shape of the amorphous magnetic material particles is the same as that of the crystalline magnetic material powder and therefore is not described. In relation to a production method, it is easy that the amorphous magnetic material particles are spherical or oval in some cases. In general, the amorphous magnetic material is harder than the crystalline magnetic material. Therefore, it is preferable that the crystalline magnetic material particles are non-spherical so as to be readily deformed during press-molding in some cases.

The shape of the amorphous magnetic material particles may be a shape obtained in the course of producing the amorphous magnetic material or a shape obtained by secondarily processing the produced amorphous magnetic material. Examples of the former shape include a spherical shape, an oval shape, and a needle shape. An example of the latter shape is a flake shape.

The particle diameter of the amorphous magnetic material powder is set in relation to the particle diameter of the crystalline magnetic material powder as described above. In particular, the median diameter D50 (herein also referred to as the "first median diameter d1") of the amorphous magnetic material particles is greater than or equal to the median diameter D50 (herein also referred to as the "second median diameter d2") of the crystalline magnetic material particles. When the amorphous magnetic material particles and the crystalline magnetic material particles satisfy the above relation, the crystalline magnetic material particles, which are relatively soft, readily enters cavities formed by the amorphous magnetic material particles, which are relatively hard, and therefore the core alloy ratio is likely to be high. When the second median diameter d2 is excessively large, the core loss Pcv of the inductor including the dust core 1 is likely to be high in some cases. Therefore, the second median diameter d2 is preferably 10 μm or less in some cases.

The ratio (first particle size ratio) of the 10% cumulative diameter $D10_a$ in the volume-based cumulative particle size distribution of the amorphous magnetic material powder to the 90% cumulative diameter $D90_b$ in the volume-based cumulative particle size distribution of the crystalline magnetic material powder ranges from 0.3 to 2.6. When the first particle size ratio is within this range, enhancing direct-current superposition characteristics of the inductor including the dust core 1 and suppressing the increase in core loss Pcv thereof can be both achieved. When the first particle size ratio is excessively low, the core loss Pcv of the inductor including the dust core 1 tends to increase significantly with the increase of the first mixing ratio. When the first particle size ratio is high, direct-current superposition characteristics of the inductor including the dust core 1 are likely to be improved with the increase of the first mixing ratio. However, when the first particle size ratio is excessively high, the core loss Pcv of the inductor including the dust core 1 tends to be high regardless of the first mixing ratio. Thus, the first particle size ratio preferably ranged from 0.5 to 2.6, more preferably 0.5 to 2.3, further more preferably 0.8 to 2.3, and particularly preferably 0.95 to 2.3.

(3) Binding Component

The dust core 1 may contain the binding component. The composition of the binding component is not limited and the binding component may be material contributing to fixing the amorphous magnetic material powder and the amorphous magnetic material powder (these powders are herein referred to as the "magnetic powders" in some cases). Examples of material making up the binding component include organic materials such as a resin material and the pyrolysis residue of the resin material (these are herein collectively referred to as the "resin material-based components") and inorganic materials. Examples of the resin material include acrylic resins, silicone resins, epoxy resins, phenol resins, urea resins, and melamine resins. An example of a binding component made of an inorganic material is a glass material such as waterglass. The binding component may be composed of a single type of material or different types of materials. The binding component may be a mixture of an organic material and an inorganic material.

The binding component used is usually an insulating material. This enables insulating properties of the dust core 1 to be increased.

2. Method for Manufacturing Dust Core

A method for manufacturing the dust core 1 is not particularly limited. Using a method below allows the dust core 1 to be more efficiently manufactured. The method for manufacturing the dust core 1 includes a molding step below and may further include a heat treatment step.

(1) Molding Step

First, a mixture containing the magnetic powders and a component giving the binding component in the dust core 1 is prepared. The component (herein also referred to as the "binder component") giving the binding component is the binding component itself in some cases or a material different from the binding component in some cases. An example of the latter is the case where the binder component is the resin material and the binding component is the pyrolysis residue thereof.

A molded product can be obtained by molding including press-molding the mixture. Pressing conditions are not limited and are determined on the basis of the composition of the binder component or the like. When the binder component is made of, for example, a thermosetting resin, the curing reaction of the thermosetting resin is preferably allowed to proceed in a die by pressing and heating. In the case of compacting, although the pressing force is high, heating is not a necessary condition and pressing is performed in a short time.

The case where the mixture is a granular powder and is compacted is described below in detail. The granular powder is excellent in handleability and can increase the workability of a compacting step which has a short molding time and which is excellent in production efficiency.

(1-1) Granular Powder

The granular powder contains the magnetic powders and the binder component. The content of the binder component in the granular powder is not particularly limited. When the content thereof is excessively low, the binder component is unlikely to hold the magnetic powders. Furthermore, when the content of the binder component is excessively low, the binding component made of the pyrolysis residue of the binder component is unlikely to insulate the magnetic powders from each other in the dust core 1 obtained through the heat treatment step. However, when the content of the binder component is excessively high, the content of the binding component in the dust core 1 obtained through the heat treatment step is likely to be high. Increasing the content of the binding component in the dust core 1 is likely to reduce magnetic properties of the dust core 1. Therefore, the content of the binder component in the granular powder is preferably 0.5 mass percent to 5.0 mass percent. From the viewpoint of stably reducing the possibility that the magnetic properties of the dust core 1 are reduced, the content of the binder component in the granular powder is preferably 1.0 mass percent to 3.5 mass percent and more preferably 1.2 mass percent to 3.0 mass percent.

The granular powder may contain a material other than the magnetic powders and the binder component. Examples of such a material include lubricants, silane coupling agents, and insulating fillers. When the granular powder contains a lubricant, the type thereof is not particularly limited. The lubricant may be organic or inorganic. Examples of an organic lubricant include metal soaps such as zinc stearate and aluminium stearate. It is conceivable that the organic lubricant evaporates in the heat treatment step and hardly remains in the dust core 1.

A method for producing the granular powder is not particularly limited. The granular powder may be obtained in such a manner that components giving the granular powder are directly kneaded and an obtained kneaded product is crushed by a known process or in such a manner that slurry is prepared by adding a dispersion medium (for example, water) to the above components and is dried, followed by crushing. The particle size distribution of the granular powder may be controlled by sieving or classification after crushing.

Figure 2:
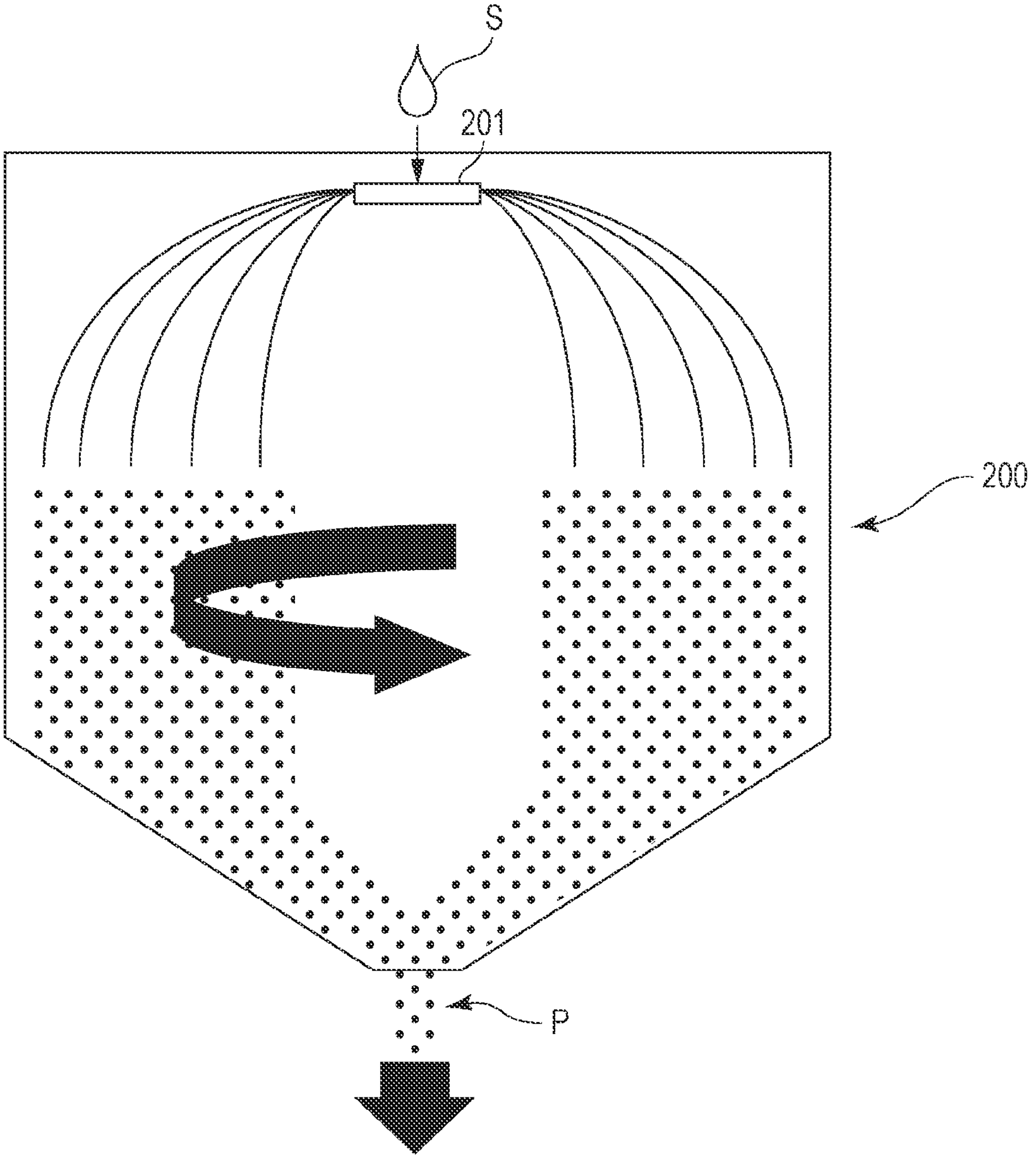
FIG. 2 is a schematic view of a spray drier system used in an example of a method for producing a granular powder.

An example of a method for obtaining the granular powder from the above slurry is a method using a spray drier. As shown in FIG. 2, a rotor 201 is placed in a spray drier system 200 and slurry S is fed from an upper portion of the spray drier system 200 toward the rotor 201. The rotor 201 is rotating at a predetermined rotational speed to spray the slurry S in a chamber inside the spray drier system 200 in the form of small droplets by centrifugal force. Furthermore, hot air is introduced into the chamber inside the spray drier system 200, whereby a dispersion medium (water) contained in the slurry S in the form of small droplets is evaporated with the small droplets maintained. As a result, a granular powder P is formed from the slurry S. The granular powder P is collected from a lower portion of the spray drier system 200. The following parameters may be appropriately set: parameters such as the number of revolutions of the rotor 201, the temperature of the hot air introduced into the spray drier system 200, and the temperature of a lower portion of the chamber. Examples of the preset range of each of the parameters are as follows: the number of revolutions of the rotor 201 is 4,000 rpm to 6,000 rpm, the temperature of the hot air introduced into the spray drier system 200 is 130° C. to 170° C., and the temperature of the lower portion of the chamber is 80° C. to 90° C. The atmosphere and pressure in the chamber may be appropriately set. For example, the atmosphere in the chamber is an air atmosphere and the pressure therein is 2 mm $H_2O$ (about 0.02 kPa) in terms of the pressure difference from atmospheric pressure. The particle size distribution of the obtained granular powder P may be further controlled by sieving.

(1-2) Pressing Conditions

Pressing conditions for compacting are not particularly limited and may be appropriately determined in consideration of the composition of the granular powder, the shape of a molded product, or the like. When the pressing force used to compact the granular powder is excessively low, the mechanical strength of the molded product is low. Therefore, the following problems are likely to occur: problems such as the reduction in handleability of the molded product and the reduction in mechanical strength of the dust core 1 obtained from the molded product. Furthermore, magnetic properties and/or insulating properties of the dust core 1 are reduced in some cases. However, when the pressing force used to compact the granular powder is excessively high, it is difficult to prepare a molding die capable of withstanding the pressing force. From the viewpoint of stably reducing the possibility that the molding step adversely affects mechanical properties and/or magnetic properties of the dust core 1 and the viewpoint of facilitating industrial mass production, the pressing force used to compact the granular powder is preferably 0.3 GPA to 2 GPa, more preferably 0.5 GPA to 2 GPa, and particularly preferably 0.8 GPA to 2 GPa.

In compacting, pressing may be performed together with heating or may be performed at room temperature.

(2) Heat Treatment Step

The molded product obtained in the molding step may be the dust core 1. The dust core 1 may be obtained in such a manner that the molded product is subjected to the heat treatment step as described below.

In the heat treatment step, magnetic properties are adjusted in such a manner that the distance between particles in the magnetic powders is modified by heating the molded product obtained in the molding step and are also adjusted by reducing the strain imparted to the particles in the magnetic powders in the molding step, whereby the dust core 1 is obtained.

Since the heat treatment step is intended to adjust the magnetic properties of the dust core 1 as described above, heat treatment conditions such as heat treatment temperature are set such that the magnetic properties of the dust core 1 are optimum. An example of a method for setting the heat treatment conditions is as follows: the heating temperature of the molded product is varied and other conditions such as a heating rate and a holding time at a heating temperature are kept constant.

Standards for evaluating the magnetic properties of the dust core 1 to set the heat treatment conditions are not particularly limited. The core loss Pcv of the dust core 1 can be cited as an example of an evaluation item. In this case, the heating temperature of the molded product may be set such that the core loss Pcv of the dust core 1 is minimized. Conditions for measuring the core loss Pcv thereof are appropriately set. For example, conditions including a frequency of 100 kHz and a maximum effective magnetic flux density Bm of 100 mT are cited.

An atmosphere for heat treatment is not particularly limited. In an oxidizing atmosphere, the possibility that the pyrolysis of the binder component proceeds excessively or the possibility that the oxidation of the magnetic powders proceeds is high. Therefore, heat treatment is preferably performed in an inert atmosphere such as a nitrogen or argon atmosphere or a reducing atmosphere such as a hydrogen atmosphere.

3. Electronic/Electric Component

An electronic/electric component according to an embodiment of the present invention includes the dust core 1, a coil, and connection terminals each connected to an end portion of the coil. Herein, at least one portion of the dust core 1 is placed so as to be located in an induced magnetic field generated by the current applied to the coil through the connection terminals.

Figure 3:
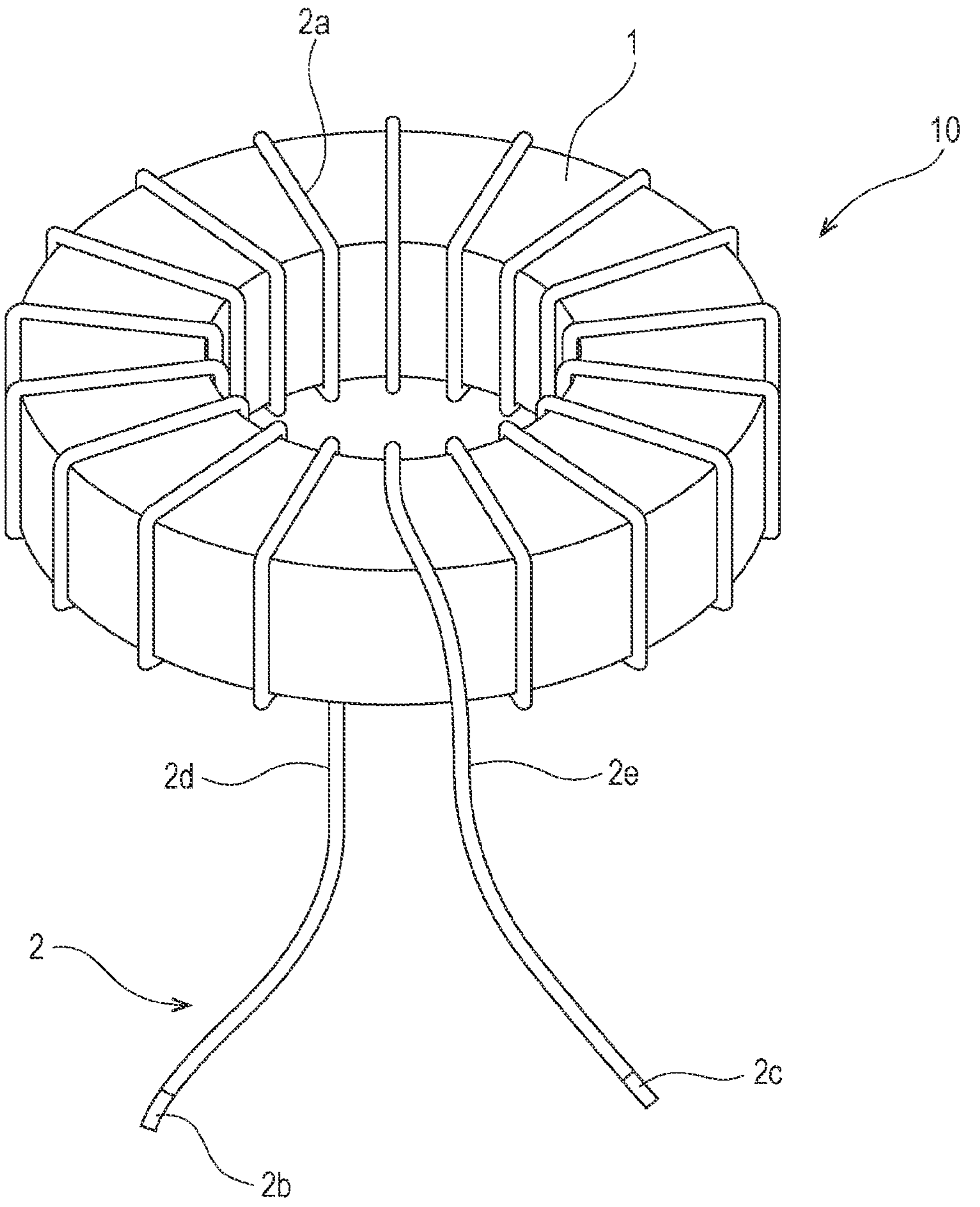
FIG. 3 is a schematic perspective view of a toroidal coil that is a type of inductor including the dust core shown in FIG. 1.

An example of the electronic/electric component is a toroidal coil 10 shown in FIG. 3. The toroidal coil 10 includes the dust core (toroidal core) 1, which is ring-shaped, and a coil 2*a* formed by winding a coated conductive wire 2 around the dust core (toroidal core) 1. End portions 2*d* and 2*e* of the coil 2*a* can be defined in sections of the coated conductive wire 2 that are located between the coil 2*a*, which is composed of the wound coated conductive wire 2, and end portions 2*b* and 2*c* of the coated conductive wire 2. As described above, in the electronic/electric component, a member making up the coil 2*a* and a member making up the connection terminals may be the same.

EMBODIMENTS

The present invention is further described below in detail with reference to examples and the like. The scope of the present invention is not limited to the examples or the like.

Examples 1 to 24

(1) Preparation of Amorphous Magnetic Material Powders

Raw materials were weighed so as to give the composition $Fe_{71.4}Ni_6Cr_2P_{10.8}C_{7.8}B_2$, followed by preparing seven types of powders (amorphous powders) of an amorphous magnetic material that had different particle size distributions by a water atomization method. The particle size distribution of each obtained amorphous magnetic material powder was measured with "Microtrac Particle Size Distribution Analyzer MT 3300EX" manufactured by Nikkiso Co., Ltd. in terms of a volume distribution, followed by determining the 10% cumulative diameter D10 in the volume-based cumulative particle size distribution of the amorphous magnetic material powder, the 50% cumulative diameter (first median diameter d1) D50 in the volume-based cumulative particle size distribution thereof, and the 90% cumulative diameter D90 in the volume-based cumulative particle size distribution thereof. Furthermore, a powder of insulated carbonyl iron was prepared as a crystalline magnetic material. Parameters relating to the particle size distribution of this powder were as described below.

The 10% cumulative diameter D10 in the volume-based cumulative particle size distribution: 2.13 μm The 50% cumulative diameter (second median diameter d2) D50 in the volume-based cumulative particle size distribution: 4.3 μm The 90% cumulative diameter D90 in the volume-based cumulative particle size distribution: 7.55 μm The first particle size ratio was calculated from these values. The results are shown in Table 1.

(2) Preparation of Granular Powders

Each of the obtained amorphous magnetic material powders was mixed with the crystalline magnetic material powder such that a first mixing ratio shown in Table 1 was obtained, whereby a magnetic powder was obtained. With water serving as a dispersion medium, 98.4 parts by mass of the obtained magnetic powder and 1.4 parts by mass of an insulating binding material made of an acrylic resin were mixed, whereby slurry was obtained.

The obtained slurry was dried, followed by grinding and sieving with a sieve with 300 μm openings, whereby a granular powder composed of particles passing through a 300 m mesh was obtained.

(3) Compacting

The obtained granular powder was filled into a die and was press-molded with a surface pressure of 1.96 GPa, whereby a ring-shaped compact having an outside diameter of 20 mm, an inside diameter of 12.7 mm, and a thickness of 7 mm was obtained.

(4) Heat Treatment

The obtained compact was put in a furnace with a nitrogen flow atmosphere and was heat-treated in such a manner that the temperature in the furnace was increased from room temperature (23° C.) to a temperature of 370° C. at a heating rate of 10° C./minute and the molded product was held at this temperature for 1 hour and was then cooled to room temperature in the furnace, whereby a toroidal core composed of a dust core was obtained.

TABLE 1

| | Particle diameter of amorphous powder/μm | | | First mixing ratio | First particle |
|---|---|---|---|---|---|
| Examples | D10 | D50 | D90 | (mass percent) | size ratio |
| 1 | 2.8 | 5.0 | 9.1 | 0 | 0.37 |
| 2 | 2.8 | 5.0 | 9.1 | 5 | 0.37 |
| 3 | 2.8 | 5.0 | 9.1 | 10 | 0.37 |
| 4 | 2.8 | 5.0 | 9.1 | 20 | 0.37 |
| 5 | 3.6 | 8.1 | 17.3 | 0 | 0.48 |
| 6 | 3.6 | 8.1 | 17.3 | 10 | 0.48 |
| 7 | 3.6 | 8.1 | 17.3 | 20 | 0.48 |
| 8 | 7.2 | 11.4 | 19.7 | 0 | 0.95 |
| 9 | 7.2 | 11.4 | 19.7 | 5 | 0.95 |
| 10 | 7.2 | 11.4 | 19.7 | 10 | 0.95 |
| 11 | 7.2 | 11.4 | 19.7 | 20 | 0.95 |
| 12 | 7.0 | 15.4 | 27.2 | 20 | 0.93 |
| 13 | 9.5 | 24.3 | 49.4 | 0 | 1.25 |
| 14 | 9.5 | 24.3 | 49.4 | 5 | 1.25 |
| 15 | 9.5 | 24.3 | 49.4 | 10 | 1.25 |
| 16 | 9.5 | 24.3 | 49.4 | 15 | 1.25 |
| 17 | 9.5 | 24.3 | 49.4 | 20 | 1.25 |
| 18 | 9.5 | 24.3 | 49.4 | 35 | 1.25 |
| 19 | 9.5 | 24.3 | 49.4 | 50 | 1.25 |
| 20 | 10.7 | 29.0 | 81.8 | 20 | 1.42 |
| 21 | 19.6 | 48.0 | 120.0 | 0 | 2.59 |
| 22 | 19.6 | 48.0 | 120.0 | 3 | 2.59 |
| 23 | 19.6 | 48.0 | 120.0 | 5 | 2.59 |
| 24 | 19.6 | 48.0 | 120.0 | 10 | 2.59 |

(Test Example 1) Measurement of Core Loss Pcv

A toroidal coil was obtained by winding a coated copper wire around the primary side and secondary side of the toroidal core, prepared in each of Examples 1 to 24, 40 times and 10 times, respectively. The toroidal coil was measured for core loss Pcv (unit: $kW/m^3$) at a measurement frequency of 100 kHz using a BH analyzer ("SY-8218" manufactured by Iwatsu Electric Co., Ltd.) under such conditions that the maximum effective magnetic flux density Bm was 100 mT. The results are shown in Table 2.

(Test Example 2) Measurement of Magnetic Permeability

A toroidal coil was obtained by winding a coated copper wire around the toroidal core prepared in each example 34 times. The toroidal coil was measured for initial magnetic permeability μ0 at a frequency of 100 kHz using an impedance analyzer ("42841A" manufactured by HP Inc.) and was also measured for relative magnetic permeability μ5500 in such a state that a direct current was superimposed and the direct current-applied magnetic field obtained thereby was 5,500 A/m. The results are shown in Table 2.

(Test Example 3) Measurement of Core Density and Core Alloy Ratio

The toroidal core prepared in each example was measured for size and weight. The density of the toroidal core was calculated from these values. The results are shown in Table 2. Since the specific gravity of the amorphous magnetic material was 7.348 g/cm$^3$ and the specific gravity of the crystalline magnetic material was 7.874 g/cm$^3$, the alloy specific gravity of magnetic powders contained in the toroidal core was determined using these values and the first mixing ratio. The core density determined in advance was divided by the alloy specific gravity, whereby the core alloy ratio of the toroidal core was determined. The results are shown in Table 2.

the relative magnetic permeability μ5500 tended to be unlikely to be increased even though the first mixing ratio was increased. From this tendency and the relationship between the first mixing ratio and the core loss Pcv, it was confirmed that the first mixing ratio had to be capped to about 20 mass percent.

Figure 7:
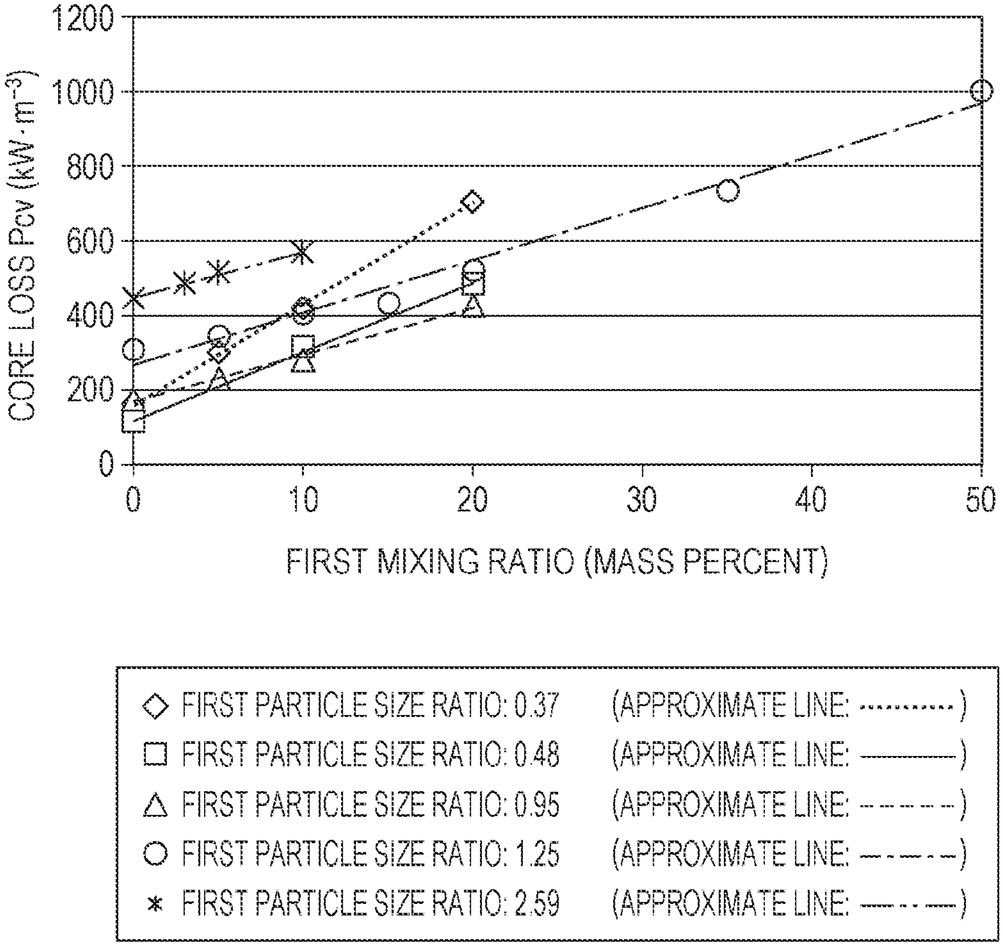
FIG. 7 is a graph showing the influence of the first particle size ratio on the relationship between the core loss Pcv and first mixing ratio based on each example of the present invention.

FIG. 7 is a graph showing the influence of the first particle size ratio on the relationship between the core loss Pcv and the first mixing ratio. It was observed that as the first particle size ratio was lower, the increase of core loss Pcv due to the increase of the first mixing ratio tended to be more significant. It was confirmed that as the first particle size ratio was higher, the core loss Pcv tended to be higher.

Figure 6:
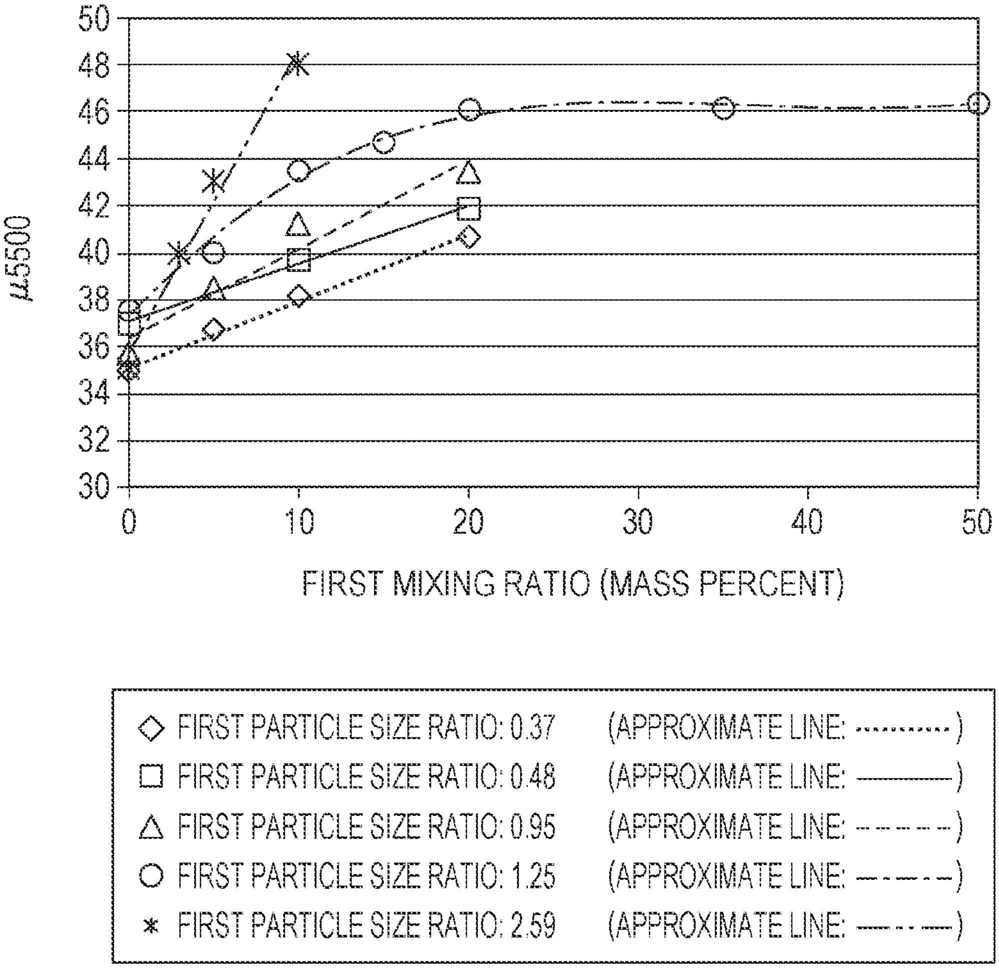
FIG. 6 is a graph showing the influence of the first particle size ratio on the relationship between μ5500 (the relative magnetic permeability when the DC applied magnetic field is 5500 A/m) and first mixing ratio based on each example of the present invention.
Figure 8:
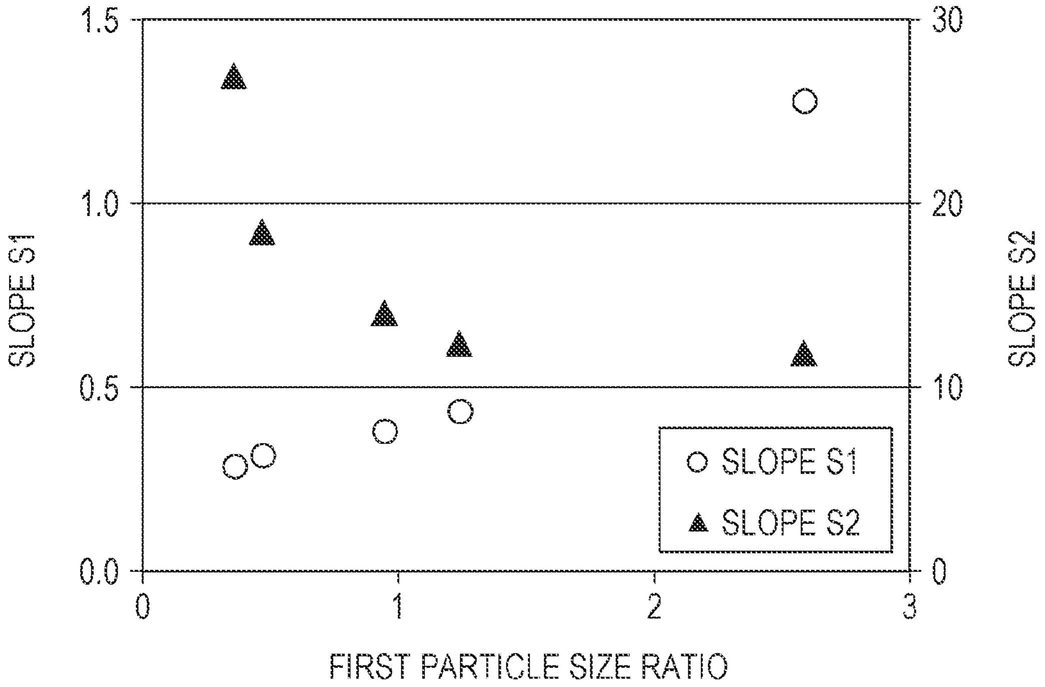
FIG. 8 is a graph obtained by plotting a slope S1 and a slope S2 against the first particle size ratio on the horizontal axis, the slope S1 being determined by linearly approximating a plot of the first particle size ratio in the graph shown in FIG. 6, the slope S2 being determined by linearly approximating a plot of the first particle size ratio in the graph shown in FIG. 7.

In order to confirm the tendencies observed in FIGS. 6 and 7, a slope S1 was determined by linearly approximating a plot of the first particle size ratio in the graph (the relationship between the relative magnetic permeability μ5500 and the first mixing ratio) shown in FIG. 6 and a slope S2 was determined by linearly approximating a plot of the first particle size ratio in the graph (the relationship between the core loss Pcv and the first mixing ratio) shown in FIG. 7. The results are shown in Table 3 and FIG. 8. FIG. 8 is a graph obtained by plotting the slopes S1 and S2 against the first particle size ratio on the horizontal axis.

TABLE 2

| Examples | Core density (g/cm$^3$) | Core alloy ratio (mass percent) | μ0 | μ5500 | Core loss Pcv (kW/m$^3$) | Remarks |
|---|---|---|---|---|---|---|
| 1 | 5.96 | 81.1 | 60.3 | 34.9 | 165 | Comparative example |
| 2 | 6.09 | 82.6 | 59.7 | 36.7 | 300 | Comparative example |
| 3 | 6.20 | 84.3 | 59.5 | 38.1 | 419 | Inventive example |
| 4 | 6.37 | 86.7 | 61.0 | 40.7 | 706 | Inventive example |
| 5 | 6.09 | 82.9 | 76.3 | 37.0 | 116 | Comparative example |
| 6 | 6.26 | 84.7 | 72.0 | 39.7 | 314 | Inventive example |
| 7 | 6.40 | 86.0 | 68.5 | 41.9 | 486 | Inventive example |
| 8 | 5.86 | 79.8 | 66.1 | 35.6 | 177 | Comparative example |
| 9 | 6.09 | 82.6 | 72.0 | 38.5 | 230 | Comparative example |
| 10 | 6.25 | 84.6 | 76.1 | 41.2 | 283 | Inventive example |
| 11 | 6.42 | 86.2 | 72.6 | 43.3 | 425 | Inventive example |
| 12 | 6.43 | 86.3 | 69.2 | 44.6 | 530 | Inventive example |
| 13 | 6.05 | 82.3 | 86.3 | 37.6 | 310 | Comparative example |
| 14 | 6.16 | 83.5 | 82.2 | 40.0 | 346 | Inventive example |
| 15 | 6.28 | 84.9 | 79.7 | 43.5 | 409 | Inventive example |
| 16 | 6.33 | 85.3 | 75.1 | 44.7 | 435 | Inventive example |
| 17 | 6.41 | 86.1 | 75.3 | 46.1 | 522 | Inventive example |
| 18 | 6.54 | 86.9 | 67.0 | 46.2 | 740 | Inventive example |
| 19 | 6.61 | 86.9 | 61.5 | 46.4 | 1009 | Inventive example |
| 20 | 6.40 | 85.9 | 80.7 | 46.2 | 513 | Inventive example |
| 21 | 6.00 | 82.0 | 68.0 | 35.0 | 450 | Comparative example |
| 22 | 6.13 | 83.0 | 72.0 | 40.0 | 486 | Inventive example |
| 23 | 6.16 | 83.5 | 73.0 | 43.0 | 513 | Inventive example |
| 24 | 6.28 | 84.9 | 77.0 | 48.0 | 570 | Inventive example |

Figure 4:
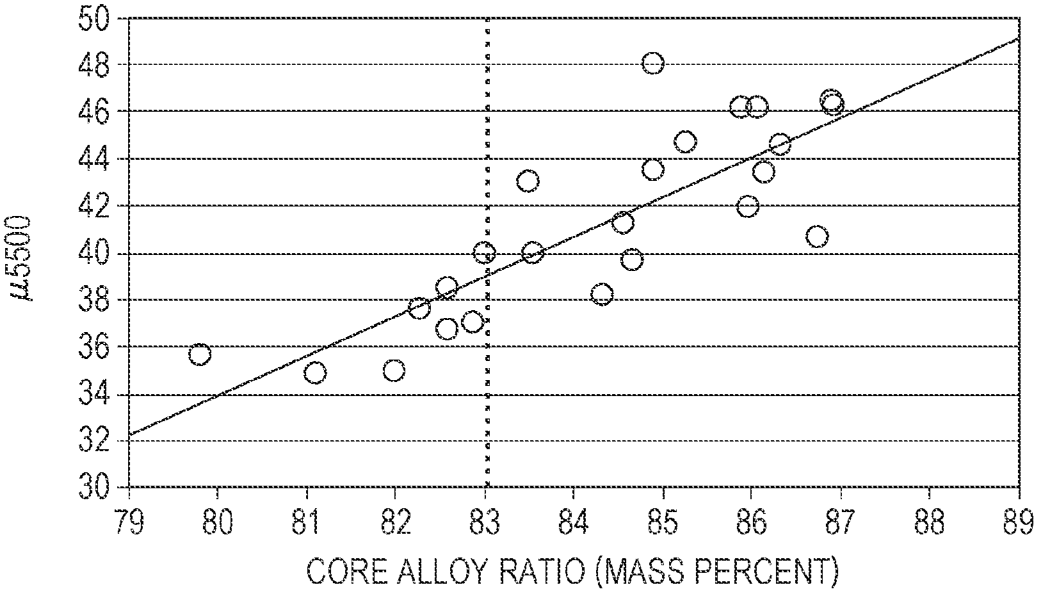
FIG. 4 is a graph showing the relationship between μ5500 (the relative magnetic permeability when the DC applied magnetic field is 5500 A/m) and core alloy ratio based on each example of the present invention.

FIG. 4 is a graph showing the relationship between the relative magnetic permeability μ5500 and the core alloy ratio. As shown in FIG. 4, it was observed that a dust core having higher core alloy ratio had higher relative magnetic permeability μ5500 and tended to have enhanced direct-current superposition characteristics.

Figure 5:
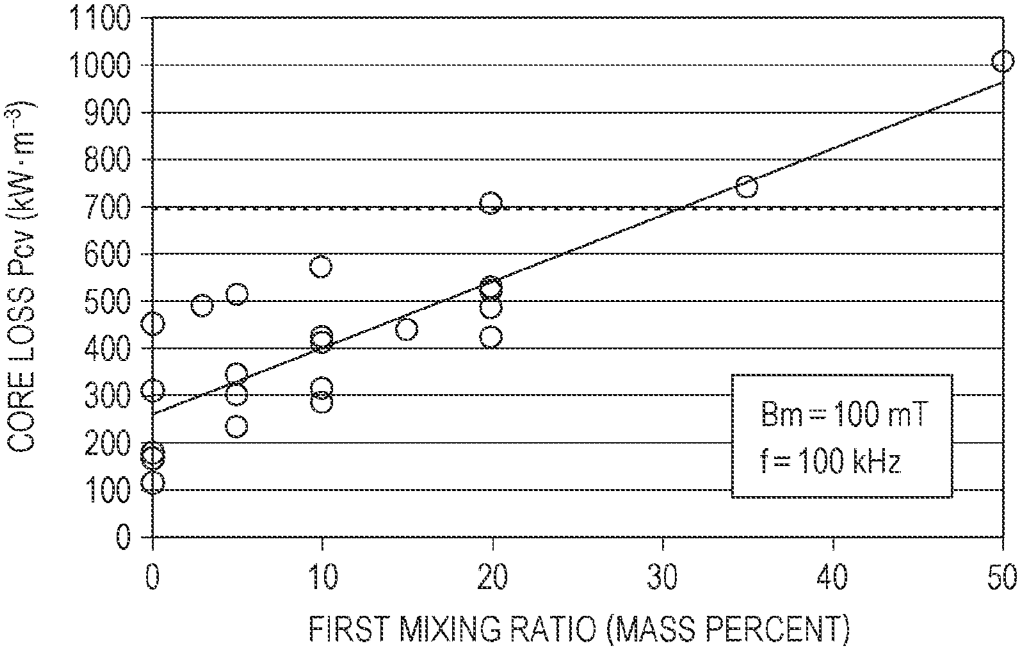
FIG. 5 is a graph showing the relationship between the core loss Pcv and first mixing ratio based on each example of the present invention.

FIG. 5 is a graph showing the relationship between the core loss Pcv and the first mixing ratio. It was observed that the core loss Pcv tended to increase with the increase of the first mixing ratio, that is, the increase in content of the crystalline magnetic material powder.

FIG. 6 is a graph showing the influence of the first particle size ratio on the relationship between the relative magnetic permeability μ5500 and the first mixing ratio. It was observed that as the first particle size ratio was higher, the increase of the relative magnetic permeability μ5500 due to the increase of the first mixing ratio tended to be more significant. As confirmed using the case where the first particle size ratio was 1.25 as an example, it was confirmed that when the first mixing ratio was 20 mass percent or more,

TABLE 3

| First particle size ratio | Slope S1 | Slope S2 |
|---|---|---|
| 0.37 | 0.28 | 26.98 |
| 0.48 | 0.32 | 18.49 |
| 0.95 | 0.38 | 14.11 |
| 1.25 | 0.44 | 12.48 |
| 2.59 | 1.28 | 12.03 |

As shown in Table 3 and FIG. 8, as the first particle size ratio is higher, the slope S1 is larger. This shows that the relative magnetic permeability μ5500 strongly depends on the first mixing ratio. This is possibly because when the first particle size ratio is high, the diameter of particles of the amorphous magnetic material is relatively large, the surface area of the crystalline magnetic material particles is therefore small, and the amorphous magnetic material particles can be coated with a small amount of the crystalline magnetic material powder.

On the other hand, as the first particle size ratio is lower, the slope S2 is larger. This shows that the core loss Pcv strongly depends on the first mixing ratio. When the slope S2 is 0.95 or more, the change of the slope S2 is small. Thus, it is clear that when the first particle size ratio is 0.95 or more, the core loss Pcv can be stably reduced. This is possibly because when the first particle size ratio is low, the diameter of the amorphous magnetic material particles is relatively small, cavities between the amorphous magnetic material particles are therefore small, and particles of the crystalline magnetic material is strongly deformed so as to enter the cavities.

Examples 25 to 27

Raw materials were weighed so as to give the composition $Fe_{71.4}Ni_6Cr_2P_{10.8}C_{7.8}B_2$, followed by preparing three types of powders (amorphous powders) of an amorphous magnetic material that had different particle size distributions by a water atomization method. The particle size distribution of each of the obtained amorphous magnetic material powders was measured with "Microtrac Particle Size Distribution Analyzer MT 3300EX" manufactured by Nikkiso Co., Ltd. in terms of a volume distribution, followed by determining the 10% cumulative diameter D10 in the volume-based cumulative particle size distribution and the 50% cumulative diameter (first median diameter d1) D50 in the volume-based cumulative particle size distribution. These results are shown in Table 4. Furthermore, a powder of insulated carbonyl iron was prepared as a crystalline magnetic material. Parameters relating to the particle size distribution of this powder were as described below.

The 10% cumulative diameter D10 in the volume-based cumulative particle size distribution: 2.13 μm The 50% cumulative diameter (second median diameter d2) D50 in the volume-based cumulative particle size distribution: 4.3 μm The 90% cumulative diameter D90 in the volume-based cumulative particle size distribution: 7.55 μm The first particle size ratio was calculated from these values. The results are shown in Table 4. From the viewpoint of readily ascertaining tendencies, results obtained in some of the above-mentioned examples are also shown in Table 4.

TABLE 4

| Examples | Particle diameter of amorphous powder/μm D10 | D50 | First mixing ratio (mass percent) | First particle size ratio | Core alloy ratio (mass percent) | μ0 | μ5500 | Remarks |
|---|---|---|---|---|---|---|---|---|
| 25 | 2.0 | 4.5 | 10 | 0.26 | 81.7 | 47.6 | 34.8 | Comparative example |
| 10 | 7.2 | 11.4 | 10 | 0.95 | 84.6 | 76.1 | 41.2 | Inventive example |
| 26 | 6.3 | 10.6 | 10 | 0.84 | 84.1 | 78.3 | 37.3 | Inventive example |
| 27 | 18.0 | 37.6 | 10 | 2.38 | 84.1 | 91.8 | 43.0 | Inventive example |
| 7 | 3.6 | 8.1 | 20 | 0.48 | 86.0 | 68.5 | 41.9 | Inventive example |
| 20 | 10.7 | 29.0 | 20 | 1.42 | 85.9 | 80.7 | 46.2 | Inventive example |
| 11 | 7.2 | 11.4 | 20 | 0.95 | 86.2 | 72.6 | 43.3 | Inventive example |

Each of the amorphous magnetic material powders was mixed with the crystalline magnetic material powder such that a first mixing ratio shown in Table 4 was obtained, whereby a magnetic powder was obtained. A toroidal core composed of a dust core was obtained by the same procedure as that used in Examples 1 to 24.

Figure 9:
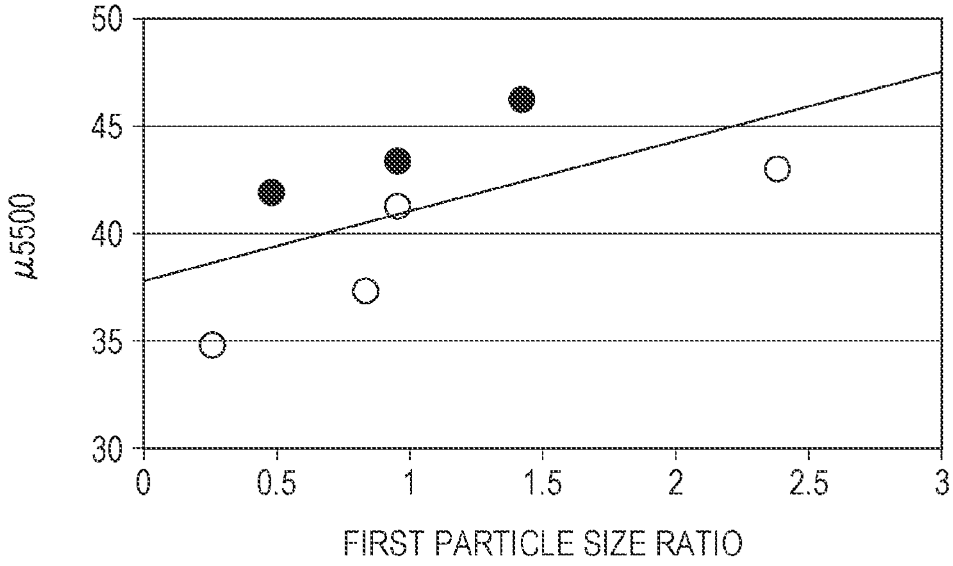
FIG. 9 is a graph showing measurement results obtained in Examples 7, 10, 11, 20, and 25 to 27.

The initial magnetic permeability μ0 and relative magnetic permeability μ5500 of the toroidal core were measured by the same test as that performed in Test Example 2. The core alloy ratio was measured by the same test as that performed in Test Example 3. Measurement results and the rate of change are shown in Table 4. FIG. 9 is a graph showing measurement results obtained in Examples 25 to 27 together with measurement results obtained in Examples 7, 10, 11, and 20. In FIG. 9, open circles (○) represent results obtained in the case where the first mixing ratio is 10 mass percent (Examples 10 to 25 and 27) and solid circles (●) represent results obtained in the case where the first mixing ratio is 20 mass percent (Examples 7, 11, and 20). As shown in FIG. 9, it was confirmed that the relative magnetic permeability μ5500 tended to increase with the increase of the increase of the first particle size ratio regardless of whether the first mixing ratio was 10 mass percent or 20 mass percent.

(Test Example 4) Measurement of Degree of Dispersion of Cavities

The toroidal core obtained in each of Examples 25 to 28 was cut, followed by observing a cross section thereof. Arbitrary three locations in the cross section were set to observation portions. In a field of view per location of about 120 μm×about 90 μm, an observation image was obtained using a secondary electron microscope.

Figure 10:
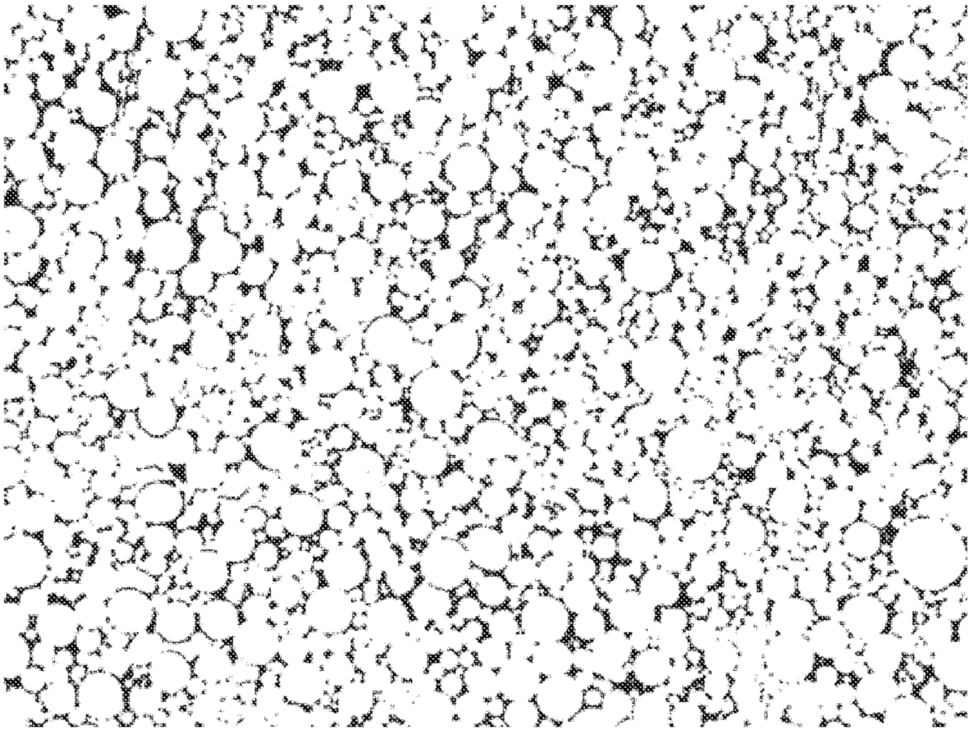
FIG. 10 is an image showing results obtained by binarizing one of three cross-sectional observation images of a toroidal core obtained in Example 25.
Figure 11:
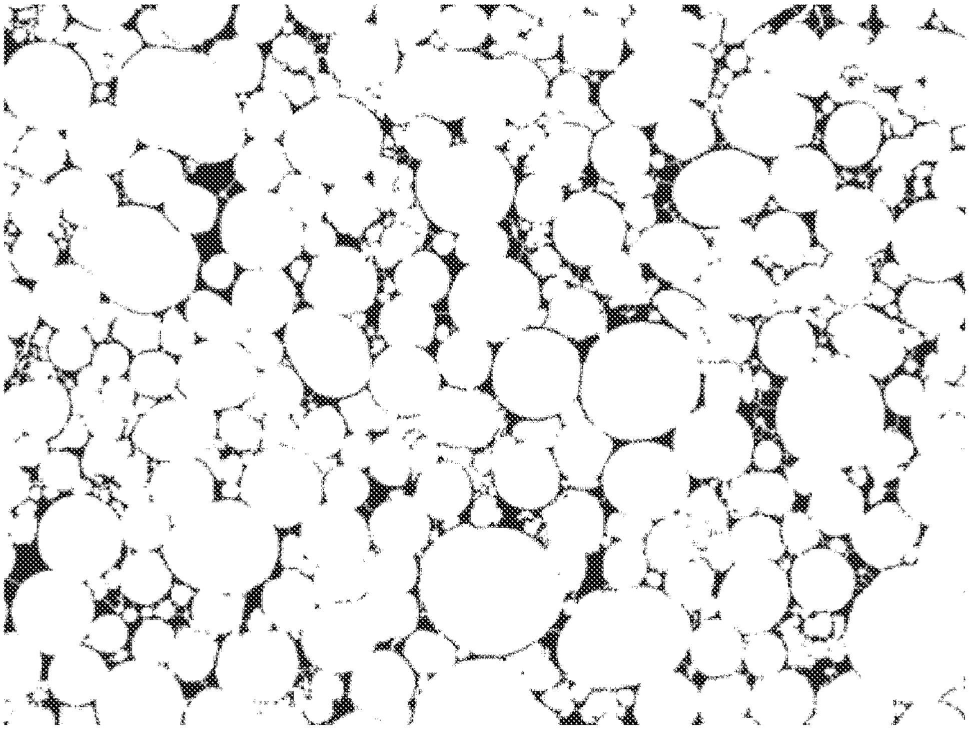
FIG. 11 is an image showing results obtained by binarizing one of three cross-sectional observation images of a toroidal core obtained in Example 10.
Figure 12:
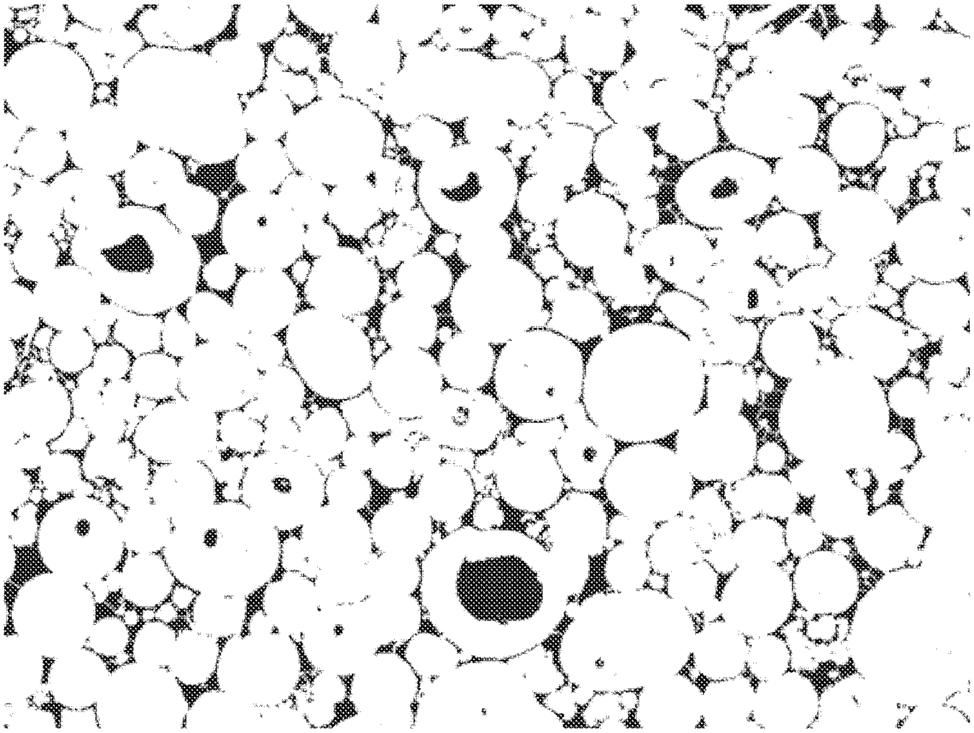
FIG. 12 is a binary image which is in a stage prior to obtaining a binary image shown in FIG. 11 and in which cavity portions based on pores of magnetic powders remain.
Figure 13:
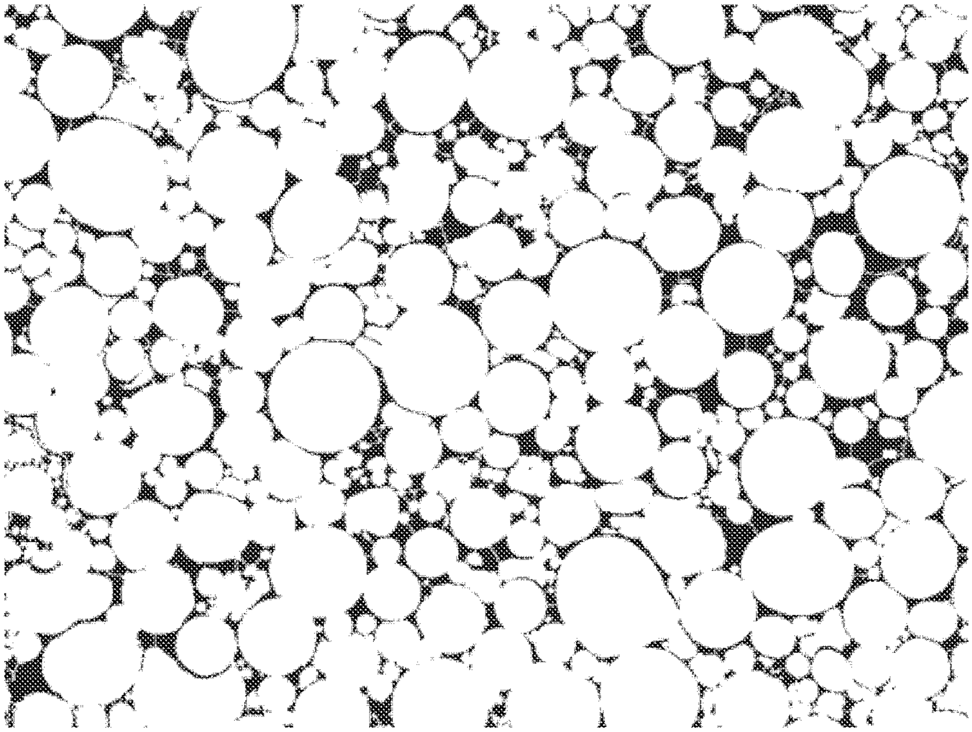
FIG. 13 is an image showing results obtained by binarizing one of three cross-sectional observation images of a toroidal core obtained in Example 26.
Figure 14:
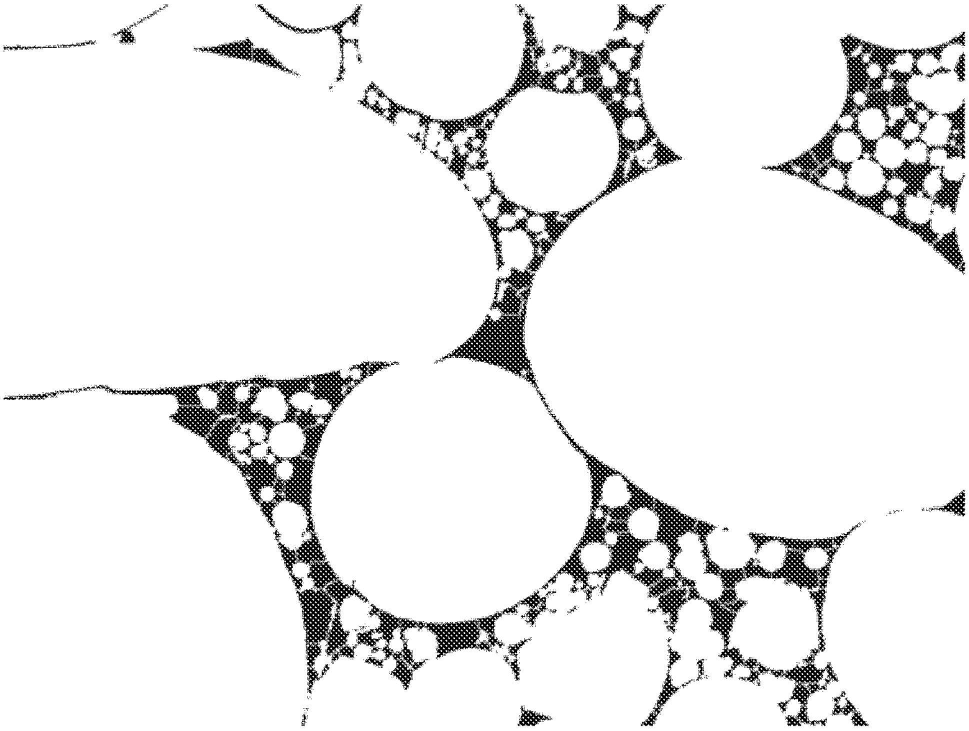
FIG. 14 is an image showing results obtained by binarizing one of three cross-sectional observation images of a toroidal core obtained in Example 27.
Figure 15:
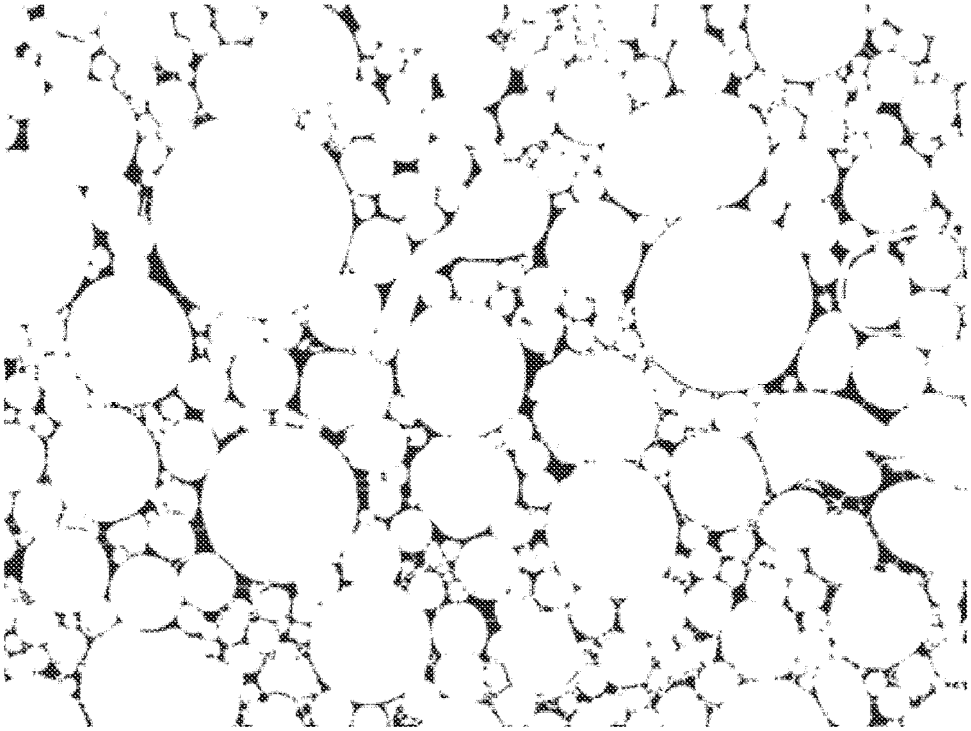
FIG. 15 is an image showing results obtained by binarizing one of three cross-sectional observation images of a toroidal core obtained in Example 7.
Figure 16:
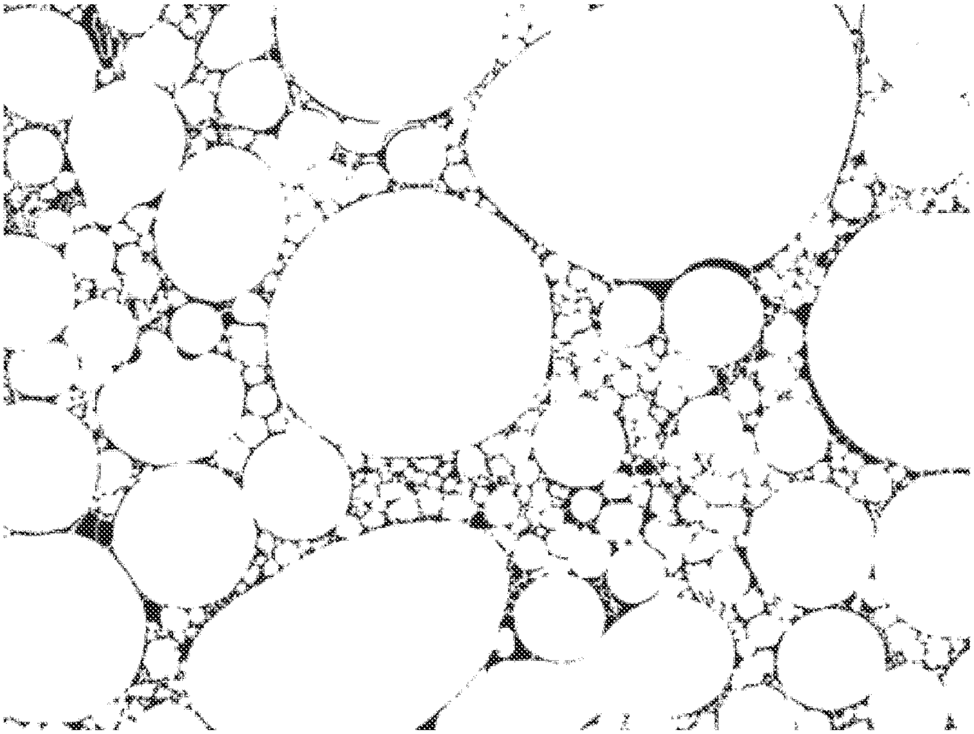
FIG. 16 is an image showing results obtained by binarizing one of three cross-sectional observation images of a toroidal core obtained in Example 20.
Figure 17:
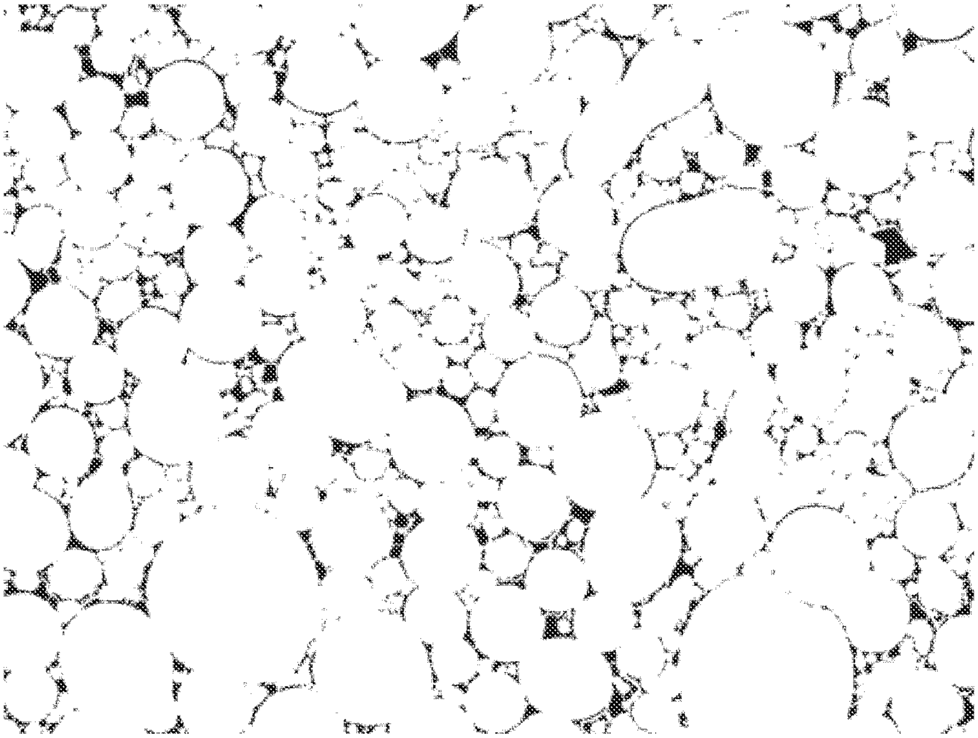
FIG. 17 is an image showing results obtained by binarizing one of three cross-sectional observation images of a toroidal core obtained in Example 11.

FIG. 10 is an image showing results obtained by binarizing one of three cross-sectional observation images of the toroidal core obtained in Example 25. FIG. 11 is an image showing results obtained by binarizing one of three cross-sectional observation images of the toroidal core obtained in Example 10. FIG. 12 is a binary image which is in a stage prior to obtaining a binary image shown in FIG. 11 and in which cavity portions based on pores of the magnetic powders remain. FIG. 13 is an image showing results obtained by binarizing one of three cross-sectional observation images of the toroidal core obtained in Example 26. FIG. 14 is an image showing results obtained by binarizing one of three cross-sectional observation images of the toroidal core obtained in Example 27. FIG. 15 is an image showing results obtained by binarizing one of three cross-sectional observation images of the toroidal core obtained in Example 7. FIG. 16 is an image showing results obtained by binarizing one of three cross-sectional observation images of the toroidal core obtained in Example 20. FIG. 17 is an image showing results obtained by binarizing one of three cross-sectional observation images of the toroidal core obtained in Example 11.

Each observation image was automatically binarized as described below. First, the minimum in a histogram of a target image that was a measurement object was set to a threshold. The average luminance of pixels with a luminance less than or equal to the threshold and the average luminance of pixels with a luminance greater than the threshold were determined, followed by setting the intermediate between these average luminances to a new threshold. The average luminance of pixels with a luminance less than or equal to the new threshold and the average luminance of pixels with a luminance greater than the new threshold were determined, followed by setting the intermediate between these average luminances to a new threshold. In this way, a new threshold was repeatedly determined. When a new threshold was less than the immediately preceding threshold, this new threshold was set to a final threshold, whereby binarization was performed. Furthermore, after a median filter was used to remove noise, ultimate eroded points were determined with respect to a region corresponding to a cavity portion, whereby the cavity portion was divided. In this way, cavity portions in the observation image were identified.

Herein, among a group of regions (the luminance gray-scale value in an image is 0) identified as cavity portions, those derived from pores formed in a magnetic powder as was clear from an initial observation image were judged to be no cavity portions and were processed into portions of the magnetic powder (in particular, the luminance gray-scale value (0) in the case of a cavity portion was replaced with the luminance gray-scale value (1) in the case of the magnetic powder) (refer to FIGS. 11 and 12). In this way, the following image was obtained from each observation image: a binary image composed of a plurality of cavity portions (luminance gray-scale value: 0) independent of each other and a background (having a luminance gray-scale value of 0 and including the magnetic powder) (refer to FIGS. 10, 11, and 13 to 17).

Figure 18:
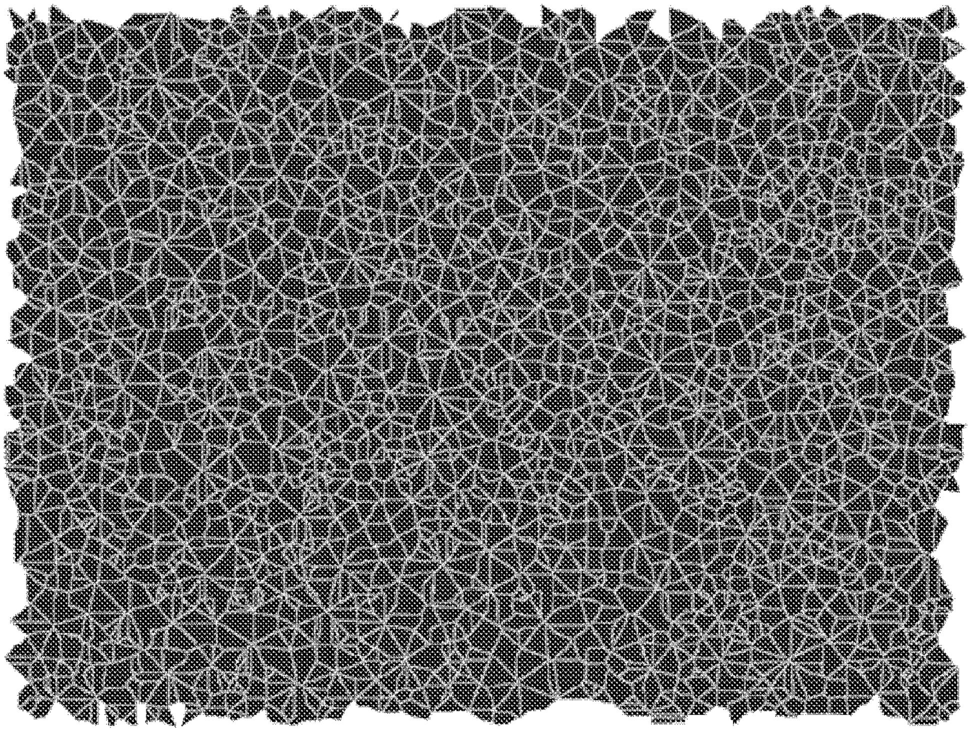
FIG. 18 is a Voronoi diagram prepared on the basis of FIG. 10.
Figure 19:
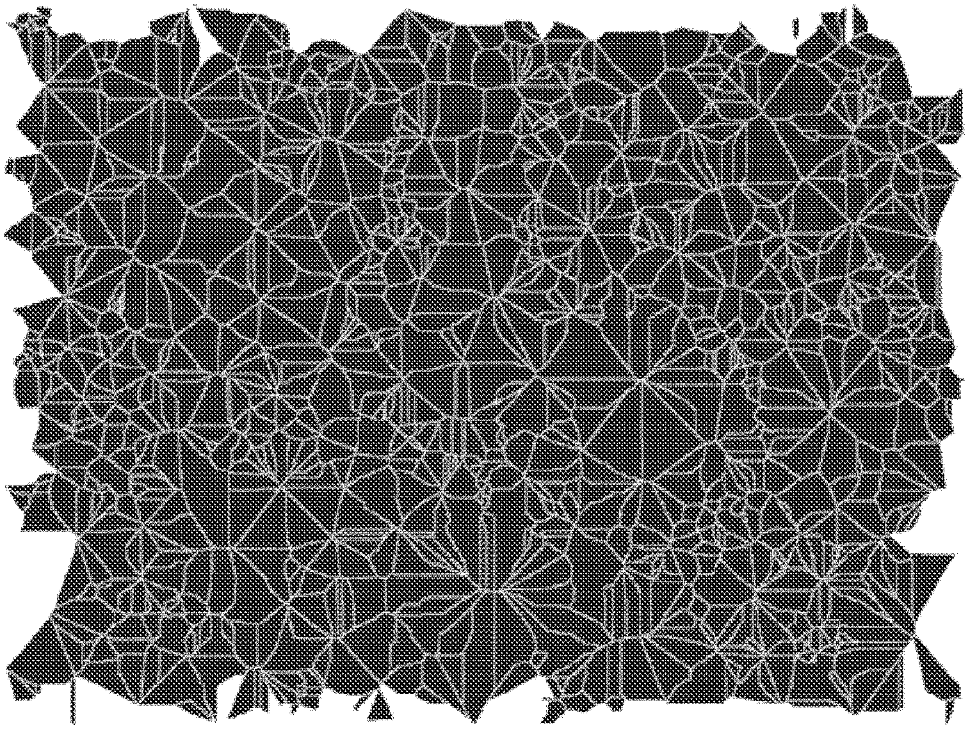
FIG. 19 is a Voronoi diagram prepared on the basis of FIG. 11.
Figure 20:
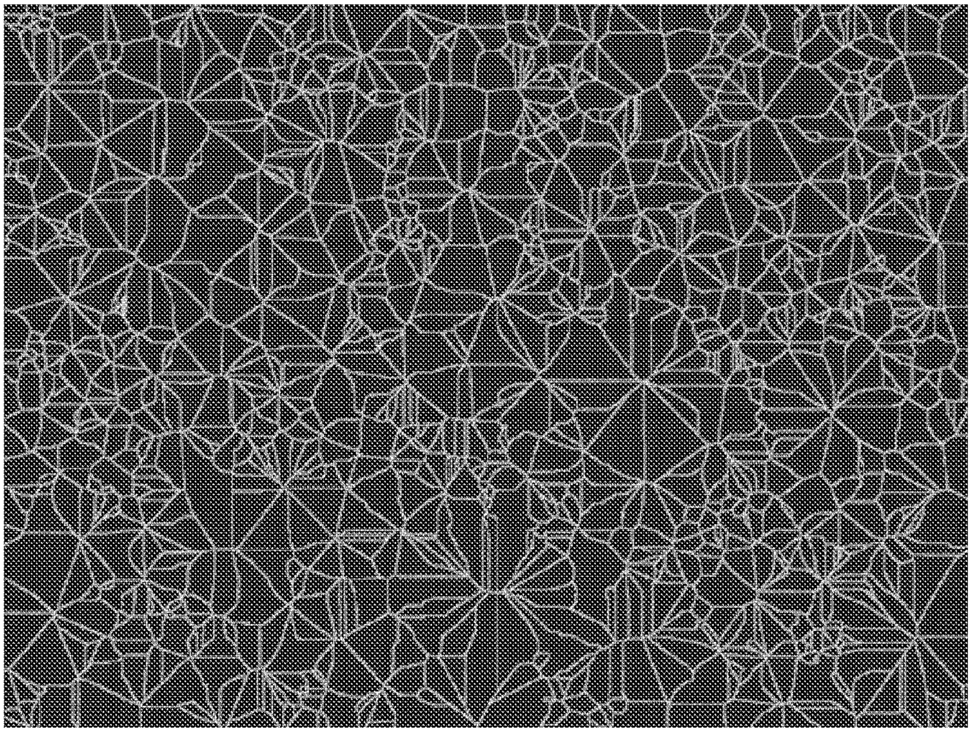
FIG. 20 is a Voronoi diagram, prior to removing peripheral polygons, in a stage prior to obtaining the Voronoi diagram shown in FIG. 19.
Figure 21:
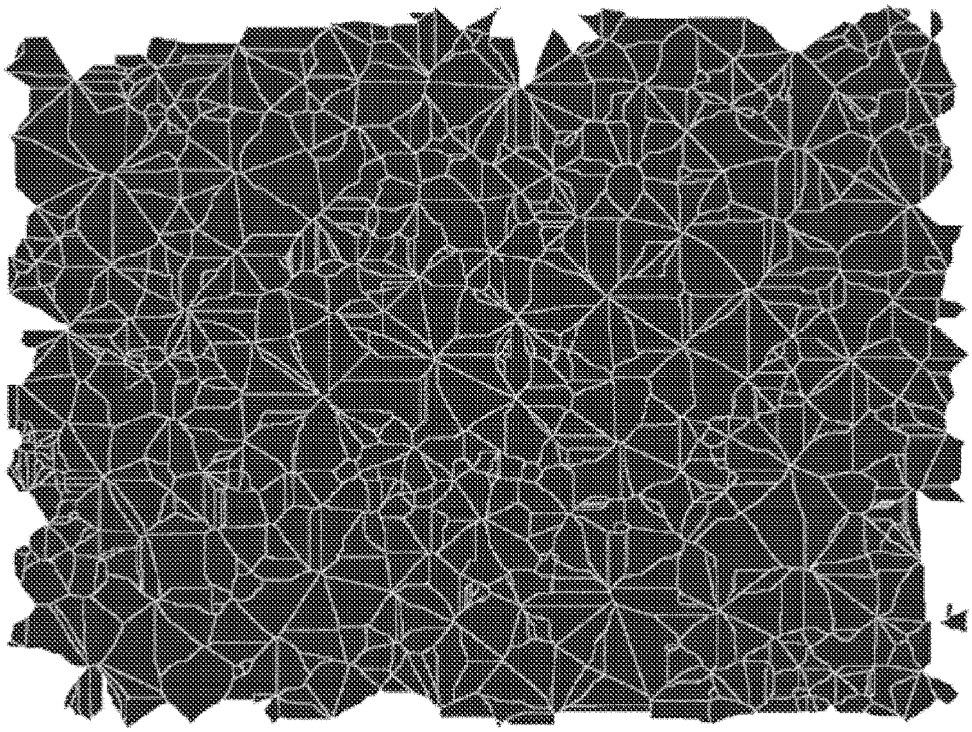
FIG. 21 is a Voronoi diagram prepared on the basis of FIG. 13.
Figure 22:
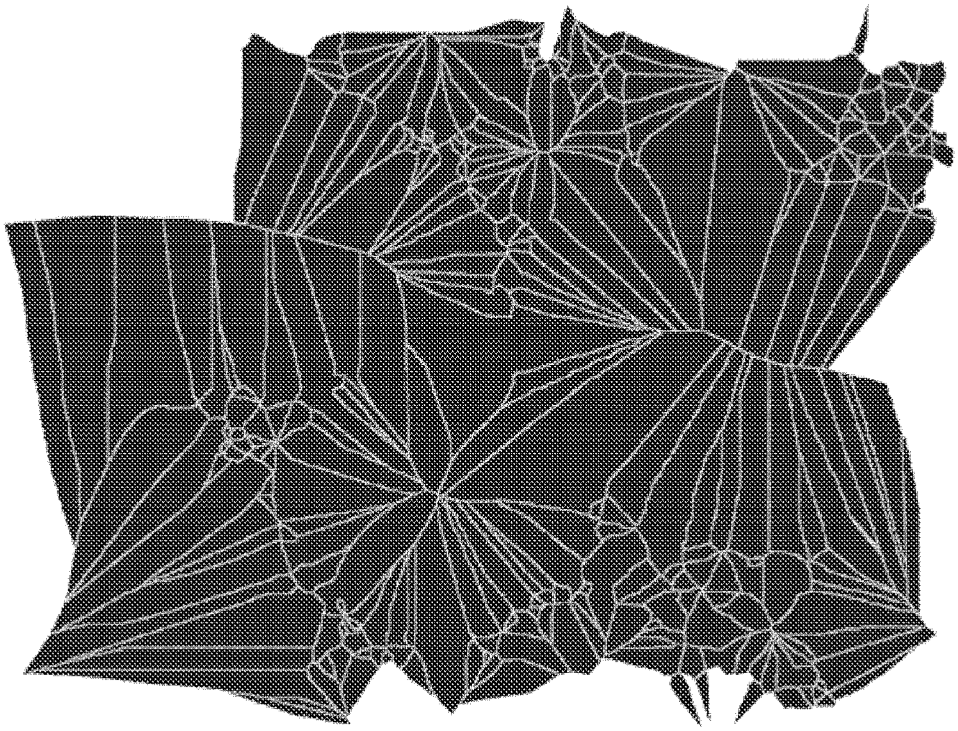
FIG. 22 is a Voronoi diagram prepared on the basis of FIG. 14.
Figure 23:
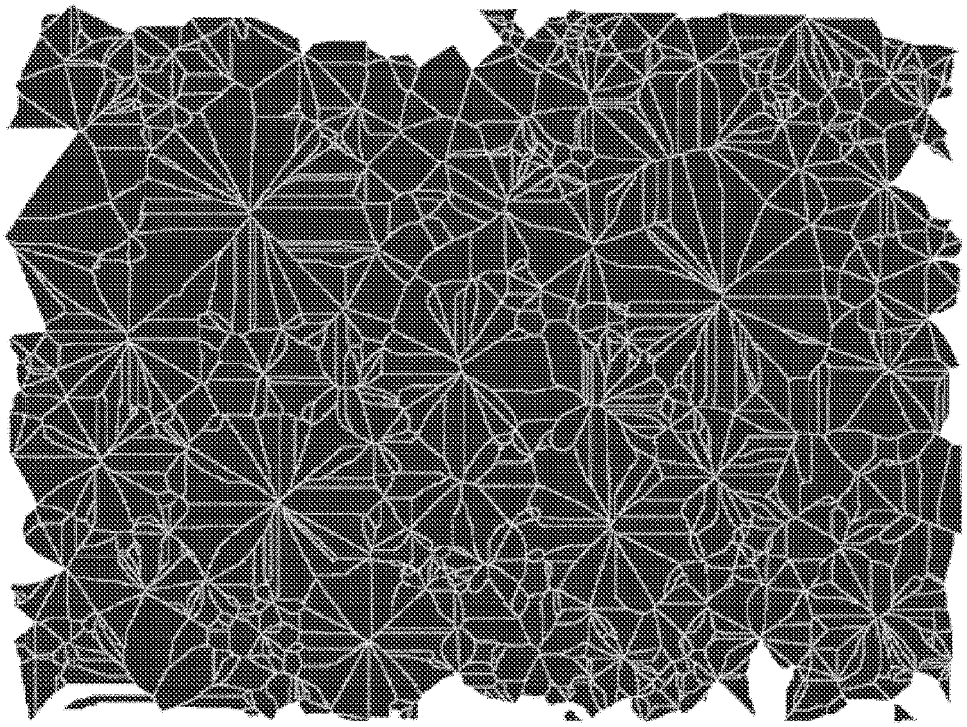
FIG. 23 is a Voronoi diagram prepared on the basis of FIG. 15.
Figure 24:
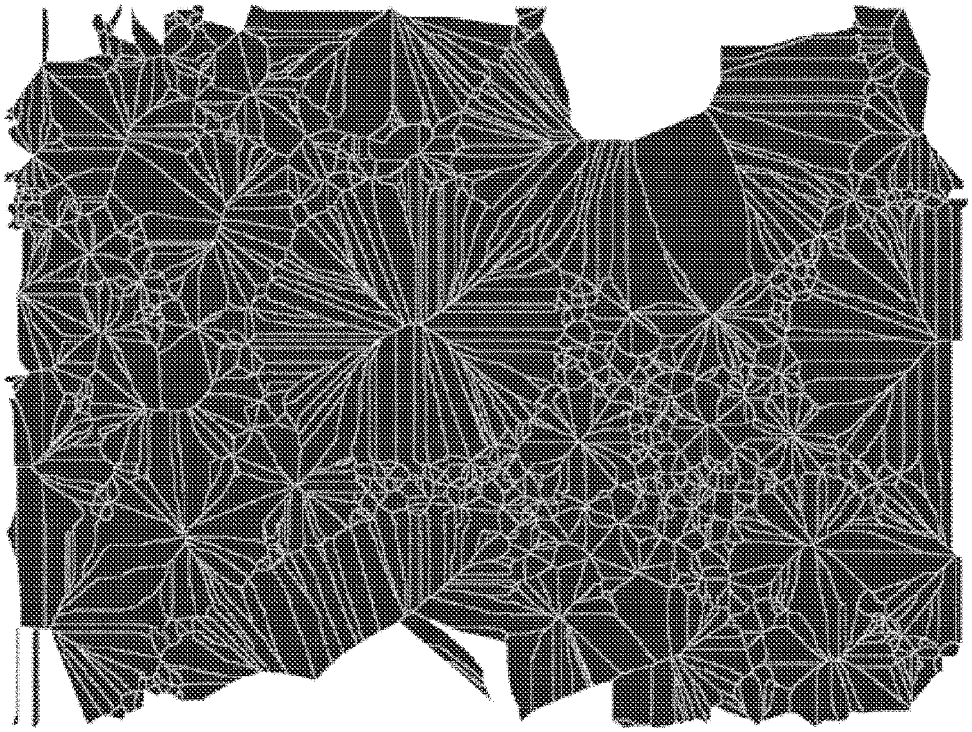
FIG. 24 is a Voronoi diagram prepared on the basis of FIG. 16.
Figure 25:
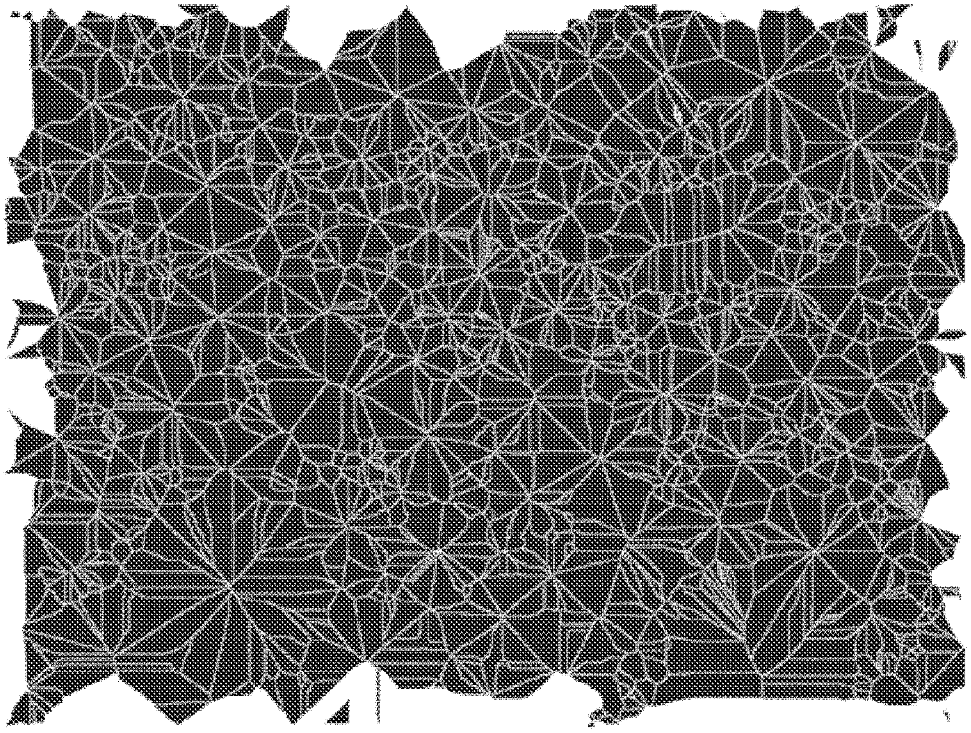
FIG. 25 is a Voronoi diagram prepared on the basis of FIG. 17.

FIG. 18 is a Voronoi diagram prepared on the basis of FIG. 10. FIG. 19 is a Voronoi diagram prepared on the basis of FIG. 11. FIG. 20 is a Voronoi diagram, prior to removing peripheral polygons, in a stage prior to obtaining the Voronoi diagram shown in FIG. 19. FIG. 21 is a Voronoi diagram prepared on the basis of FIG. 13. FIG. 22 is a Voronoi diagram prepared on the basis of FIG. 14. FIG. 23 is a Voronoi diagram prepared on the basis of FIG. 15. FIG. 24 is a Voronoi diagram prepared on the basis of FIG. 16. FIG. 25 is a Voronoi diagram prepared on the basis of FIG. 17.

A Voronoi diagram was obtained using an obtained binary image. The Voronoi diagram is a diagram obtained by connecting the bisectors between the closest cavity portions. Using the areas of a plurality of polygons shown in the Voronoi diagram enables the dispersion analysis of cavity portions. Herein, in the Voronoi diagram obtained from the binary image, polygons arranged to be in contact with the periphery (a side making up an end portion of the diagram) may possibly contain no appropriate information between the closest cavity portions. Therefore, in advance of performing the dispersion analysis of cavity portions using the Voronoi diagram, among polygons making up the Voronoi diagram, polygons (peripheral polygons) in contact with the periphery were removed (refer to FIGS. 19 and 20), followed by performing the dispersion analysis of the cavity portions using the Voronoi diagram from which the peripheral polygons were removed.

The degree of dispersion of cavities determined from the Voronoi diagram according to each example and the average thereof are shown in Table 5 together with the first particle size ratio obtained in the example. The term "degree of dispersion of cavities" refers to the value that is obtained in such a manner that the average area and area standard deviation of a plurality of polygons shown in a Voronoi diagram are determined and the area standard deviation is divided by the average area. The average area and area standard deviation of polygons determined from a Voronoi diagram are shown in Table 5.

TABLE 5

| Examples | First mixing ratio | First particle size ratio | Average area of Voronoi diagram ($\mu m^2$) | Area standard deviation of Voronoi diagram ($\mu m^2$) | Degree of dispersion of cavities | Average degree of dispersion of cavities |
|---|---|---|---|---|---|---|
| 25 | 10 | 0.26 | 3.63 | 2.43 | 0.67 | 0.69 |
| | | | 3.52 | 2.48 | 0.70 | |
| | | | 3.73 | 2.60 | 0.70 | |
| 10 | 10 | 0.95 | 8.50 | 8.67 | 1.02 | 1.01 |
| | | | 8.76 | 9.18 | 1.05 | |
| | | | 10.13 | 9.77 | 0.96 | |
| 26 | 10 | 0.84 | 10.86 | 9.86 | 0.91 | 0.96 |
| | | | 9.62 | 9.88 | 1.03 | |
| | | | 11.67 | 11.14 | 0.95 | |
| 27 | 10 | 2.38 | 26.34 | 41.12 | 1.56 | 1.84 |
| | | | 15.57 | 37.80 | 2.43 | |
| | | | 25.15 | 38.14 | 1.52 | |
| 7 | 20 | 0.48 | 9.24 | 9.81 | 1.06 | 1.08 |
| | | | 7.33 | 7.65 | 1.04 | |
| | | | 7.92 | 8.88 | 1.12 | |
| 20 | 20 | 1.42 | 7.38 | 11.41 | 1.55 | 1.42 |
| | | | 7.28 | 10.17 | 1.40 | |
| | | | 5.26 | 6.86 | 1.31 | |
| 11 | 20 | 0.95 | 6.25 | 6.39 | 1.02 | 0.99 |
| | | | 6.45 | 6.29 | 0.97 | |
| | | | 6.60 | 6.39 | 0.97 | |

Figure 26:
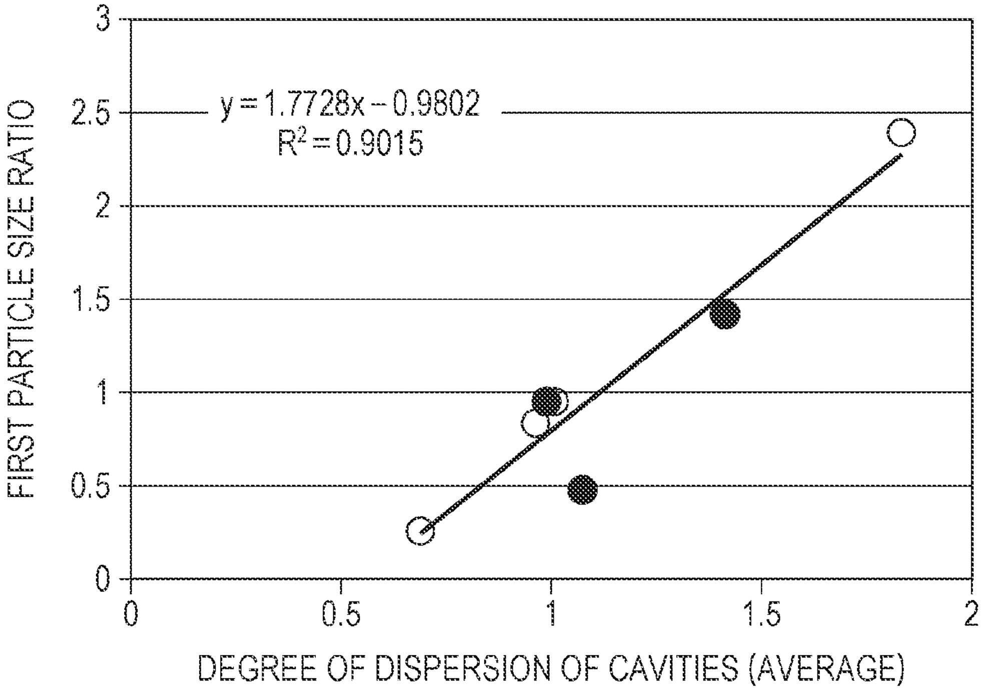
FIG. 26 is a graph showing the relationship between the average degree of dispersion of cavities and the first particle size ratio.

FIG. 26 is a graph, prepared on the basis of Table 5, showing the relationship between the degree of dispersion of cavities (average) and the first particle size ratio. In FIG. 26, open circles (○) represent results obtained in the case where the first mixing ratio is 10 mass percent (Examples 10 to 25 and 27) and solid circles (●) represent results obtained in the case where the first mixing ratio is 20 mass percent (Examples 7, 11, and 20). As shown in FIG. 26, the degree of dispersion of cavities (average) and the first particle size ratio exhibited excellent linearity and the squared correlation coefficient thereof was 0.9015. Thus, it is possible that a cross section of a dust core is observed, a Voronoi diagram is prepared by the above-mentioned procedure, and the first particle size ratio of the dust core is estimated on the basis of the degree of dispersion of cavities determined from the Voronoi diagram.

An electronic/electric component including a dust core according to the present invention can be preferably used as an inductor, such as a reactor, a transformer, or a choke coil, used in boosting circuits for hybrid vehicles, generators, and transforming stations.

What is claimed is:

1. A dust core containing:

a powder of an amorphous magnetic material having a first median diameter D50a and a first content; and a powder of a crystalline magnetic material having a second median diameter D50c and a second content, wherein a sum of the first content and the second content is 83 mass percent or more, and a mass ratio of the second content to the sum of the first content and the second content is 20 mass percent or less, wherein the first median diameter D50a is equal to or greater than the second median diameter D50c, wherein a 10% cumulative diameter D10a in a volume-based cumulative particle size distribution of the amorphous magnetic material powder is 9.5 μm or less, and wherein a ratio of a 10% cumulative diameter D10a in a volume-based cumulative particle size distribution of the amorphous magnetic material powder to a 90% cumulative diameter D90c in a volume-based cumulative particle size distribution of the crystalline magnetic material powder ranges from 0.3 to 1.25.

2. The dust core according to claim 1, wherein the crystalline magnetic material contains one or more elements selected from the group consisting of Fe—Si—Cr alloys, Fe—Ni alloys, Fe—Co alloys, Fe—V alloys, Fe—Al alloys, Fe—Si alloys, Fe—Si—Al alloys, carbonyl iron, and pure iron.

3. The dust core according to claim 2, wherein the crystalline magnetic material is made of carbonyl iron.

4. The dust core according to claim 1, wherein the amorphous magnetic material contains one or more elements selected from the group consisting of Fe—Si—B alloys, Fe—P—C alloys, and Co—Fe—Si—B alloys.

5. The dust core according to claim 4, wherein the amorphous magnetic material is made of an Fe—P—C alloy.

6. The dust core according to claim 1, wherein the crystalline magnetic material powder is made of an insulated material.

7. The dust core according to claim 1, wherein the second median diameter D50c is 10 μm or less.

8. The dust core according to claim 1, further containing a binding component binding the crystalline magnetic material powder and the amorphous magnetic material powder to another material contained in the dust core.

9. The dust core according to claim 8, wherein the binding component contains a sub-component based on a resin material.

10. A method for manufacturing the dust core according to claim 9, the method comprising:

a molding step of obtaining the dust core, the molding step including:

press-molding a mixture containing the crystalline magnetic material powder, the amorphous magnetic material powder, and a binder component made of the resin material.

11. A method for manufacturing the dust core according to claim 9, the method comprising:

a molding step of obtaining a molded product, the molding step including:

press-molding a mixture containing the crystalline magnetic material power, the amorphous magnetic material powder, and a binder component made of the resin material; and a heat treatment step of obtaining the dust core by heat-treating the molded product.

12. The dust core according to claim 1, wherein the mass ratio is 15 mass percent or less.

13. The dust core according to claim 1, wherein the mass ratio is more than 5 mass percent.

14. The dust core according to claim 1, further containing:

a binding component binding the powder of the amorphous magnetic material, and the powder of crystalline magnetic material, wherein an average degree of dispersion of cavities is 0.69 to 1.84 in a cross section of the dust core.

15. The dust core according to claim 14, wherein the average degree of dispersion of cavities is 0.69 to 1.08 in the cross section of the dust core.

16. The dust core according to claim 14, wherein the powder of the amorphous magnetic material is an Fe-based metal and the binding component is a resin material.

17. An inductor comprising:

the dust core according to claim 1;

a coil; and connection terminals each connected to an end portion of the coil, wherein the coil is capable of generating a magnetic field when a current is applied to the coil through the connection terminals, and at least one portion of the dust core is placed so as to be located in the magnetic field.

18. An electronic/electric device comprising:

the inductor according to claim 17; and a substrate, wherein the inductor is connected to the substrate through the connection terminals.

* * * * *